(12) United States Patent
Schramm et al.

(10) Patent No.: US 9,193,375 B2
(45) Date of Patent: Nov. 24, 2015

(54) STEERING APPARATUS

(75) Inventors: Michael R. Schramm, Perry, UT (US);
Brent A. Parks, Englewood, CO (US);
Marcus T. Clark, Kaysville, UT (US);
David J. Green, Brigham City, UT (US);
Guy R. Letendre, Ogden, UT (US);
Lori S. Westgate, Littleton, MA (US)

(73) Assignee: Autoliv ASP, Inc., Ogden, UT (US)

( * ) Notice: Subject to any disclaimer, the term of this patent is extended or adjusted under 35 U.S.C. 154(b) by 1957 days.

(21) Appl. No.: 11/990,066

(22) PCT Filed: Aug. 10, 2005

(86) PCT No.: PCT/US2005/028576
§ 371 (c)(1),
(2), (4) Date: Jan. 12, 2009

(87) PCT Pub. No.: WO2007/021263
PCT Pub. Date: Feb. 22, 2007

(65) Prior Publication Data
US 2009/0189373 A1 Jul. 30, 2009

(51) Int. Cl.
*B60R 21/16* (2006.01)
*G06F 17/00* (2006.01)
*B62D 1/04* (2006.01)
*B60K 35/00* (2006.01)
*B60K 37/02* (2006.01)
*B60K 37/06* (2006.01)
*B60R 11/02* (2006.01)
(Continued)

(52) U.S. Cl.
CPC .............. *B62D 1/046* (2013.01); *B60K 35/00* (2013.01); *B60K 37/02* (2013.01); *B60K 37/06* (2013.01); *B60R 11/0235* (2013.01); *B60R 11/0258* (2013.01); *B60R 11/0264* (2013.01); *B60R 21/21658* (2013.01); *B60K 2350/106* (2013.01); *B60K 2350/1024* (2013.01); *B60K 2350/1028* (2013.01); *B60K 2350/1072* (2013.01); *B60K 2350/928* (2013.01); *B60R 2011/001* (2013.01)

(58) Field of Classification Search
CPC ............... B60K 2350/1028; B60K 2350/1024; B60K 2350/10; B60K 2350/1056; B60K 2350/106; B60K 2350/1064; B60K 2350/2004; B60K 2350/928; B60K 2350/946; B60R 2011/001; B60R 2011/0042; B60R 2011/0043; B60R 2011/0045; B60R 2011/0047; B60R 11/0235; B60R 11/0258; B60R 11/0264; B60R 21/21658
USPC ....................................... 701/36, 41; 280/731
See application file for complete search history.

(56) References Cited

U.S. PATENT DOCUMENTS 4,449,728 A * 5/1984 Pilatzki ......................... 280/731
5,555,502 A 9/1996 Opel
(Continued)

Primary Examiner — John Q Nguyen
Assistant Examiner — Kyung Kim
(74) Attorney, Agent, or Firm — Madson IP, P.C.

(57) ABSTRACT

The improved steering apparatus is an invention that increases vehicular operational safety by providing means for a vehicle operator to control various vehicle functions and accessories while keeping both hands on the steering apparatus. The apparatus also automatically provides for the display of a variety of driver relevant information including automatic live video (160) feed of blind spots, rear vehicle cabin area, and road sign information (320), by displaying the information on the steering apparatus mounted video screen. The apparatus includes a built-in speaker (170) and is controlled by either voice commands or by a touching of the touch activatable video display screen (160).

15 Claims, 23 Drawing Sheets

(51) Int. Cl.
B60R 21/2165 (2011.01)
B60R 11/00 (2006.01)

(56) References Cited

U.S. PATENT DOCUMENTS

| | | | |
|---|---|---|---|
| 5,727,057 A * | 3/1998 | Emery et al. | 379/201.07 |
| 5,955,944 A * | 9/1999 | Donner | 340/475 |
| 6,059,066 A * | 5/2000 | Lary | 180/268 |
| 6,253,131 B1 | 6/2001 | Quigley et al. | |
| 6,362,734 B1 * | 3/2002 | McQuade et al. | 340/457.1 |
| 6,373,472 B1 | 4/2002 | Palalau et al. | |
| 6,418,362 B1 | 7/2002 | St. Pierre et al. | |
| 6,550,804 B2 * | 4/2003 | Burdock | 280/731 |
| 6,922,616 B2 | 7/2005 | Obradovich et al. | |
| 7,084,859 B1 * | 8/2006 | Pryor | 345/173 |
| 2002/0085043 A1 | 7/2002 | Ribak | |
| 2006/0146074 A1* | 7/2006 | Harrison | 345/660 |

* cited by examiner

STEERING APPARATUS

BACKGROUND OF THE INVENTION

1. Field of the Invention

The present invention relates to an improved steering apparatus for a vehicle. More particularly, the present invention relates to an improved steering apparatus have multiple safety, vehicle function control, vehicle accessory control, and information display enhancements.

2. Description of the Related Art

It is well known that in operating a vehicle, if vehicle controls are within easy reach of the vehicle operator and preferably are adapted to facilitate use of such controls while a vehicle operators hands remain on or in the very near vicinity of a vehicle steering wheel or like steering device, then safety and convenience are increased considerably. To that end, a number of inventions have been disclosed in attempts to improve vehicle operation safety and convenience. Such inventions, while individually advancing the state of the art with respect to their various disclosures, have failed to combine in a single convenient easy to use form, the steering wheel of the subject invention.

SUMMARY OF THE INVENTION

The present invention relates to an improved steering apparatus for a vehicle. More particularly, the present invention discloses an improved steering apparatus that increases safety by providing for vehicle function and accessory controls on a steering wheel. Vehicle functions and accessories are operated by a vehicle driver by means of either touching a touch activatable video display screen or by means of voice actuation by speaking voice commands into the apparatus. Further, the steering apparatus includes a variety of previously unknown advantages intended to provide a vehicle operator with information regarding traffic, vehicle operational status, vehicle passenger status, etc.

In the preferred embodiment of the present invention, the apparatus comprises the assembly of a steering wheel for a vehicle, a deployable airbag module having a deployable "flap", at least one touch activated LCD or like electronic video display screen, at least one microphone, and at least one speaker. The apparatus is assembled such that the airbag module is deployably mounted to the center or "hub" portion of the steering wheel, the video display screen is viewably mounted to the module flap, the microphone is mounted to an outer surface of the airbag module, and the speaker preferably defines an existing in-vehicle mounted speaker but may alternately define a speaker mounted to the airbag module. The display screen, microphone, and speaker, are further electrically connected to a vehicle mounted microprocessor or electronic control unit (ECU) which is preferably mounted to a vehicle in a location other than in the airbag module, however, the microprocessor may alternatively be mounted in the airbag module. The microprocessor preferably is also connected to other vehicle devices including vehicle entertainment systems such as radio, CD, and DVD systems, vehicle environmental control systems such as heating, defrosting, and air conditioning systems, vehicle operation monitoring systems such as speedometers, tachometers, oil pressure indicators, etc., vehicle accessories such as windshield wipers, turn signal indicators, and door locks, vehicle controls such as vehicle cruise control, vehicle gear shifting or drive control, and vehicle braking, vehicle video input systems such as live backup video feed, live blind spot video feed, and live rear vehicle cabin area video feed, and vehicle warning and information reception systems such as DSRC received data systems, DSRC transmitted data systems, and vehicle GPS systems. Further, the apparatus is adapted to wirelessly, such as via a bluetooth connection, connect with non-embedded or portable electronic devices such as a cellular phone and a personal digital assistant (PDA). The apparatus may include conventional or "hard" steering wheel mounted control buttons. However, in an effort to reduce cost, the apparatus may be free of such conventional control buttons.

In practice, while driving a vehicle having the improved steering apparatus installed in the vehicle, the operator of the vehicle is able to assess and control vehicle accessories and functions by means of touching the touch activatable video display screen or by means of speaking voice commands. Thus whether a vehicle operator uses a cell phone to place a phone call, adjust a vehicle radio volume, or locate the position of the operator's vehicle on a map, the vehicle operator need never take his hands from the steering wheel. Further in practice, a vehicle user can select information from predetermined "menus" on the video display screen or the user can create a customized personal preferred information menu system. Such customized system may be displayed by selecting a user preference function type button display on the display screen, or the customized display may be displayed automatically upon the detection of a select user via voice, retinal, or fingerprint identification, or by means of a user unique key such as a key equipped with a radio frequency identification (RFID) emission means. Should the need arise for the deployment of the airbag, the airbag will automatically deploy, and the screen will remain un-ejected from the deployable flap. Further, the screen may be preferably contained in a retaining cavity or pocket on the flap such that the screen is viewable through a window in the retaining pocket.

In an alternate embodiment of the improved steering apparatus, the apparatus functions as a dictation and memo storage and retrieval device. In practice, information for a memo is spoken into the apparatus and the display screen of the apparatus displays text corresponding to the dictated message. The memo is then storable and latter retrievable and may also be download via a universal serial bus (USB) connected to the apparatus.

In another alternate embodiment of the improved steering apparatus, the apparatus functions as a public address (PA) system that allows the vehicle operator to "break into" the information or entertainment system such as a radio broadcast or a DVD movie that is otherwise in process in the vehicle. By using the PA function of the steering apparatus, a vehicle operator is able to communicate with vehicle passengers, by speaking into the steering apparatus and having the operators voice transmitted to the vehicle passengers by means of existing vehicle cabin speakers. Optionally, the vehicle operator may select a voice modulation mode such that the sound of the user's voice as emitted form the vehicle cabin speakers is modulated or transformed into on of several predetermined voice sound types. Such sound types include for instance scary sound types, funny sound types, and may also correspond to a voice sound type of a character from a story.

In yet another alternate embodiment, the steering apparatus is substantially similar to the preferred embodiment except that the display screen is not mounted to a deployable flap. Rather in this alternate embodiment, the display screen is mounted to a non-deployable surface of the steering apparatus such that when the airbag module is deployed the display screen is not moved. While the display screen and the deployable flap may both be located on a front surface that faces a vehicle operator, the deployable flap is preferably located on a side surface of the airbag module. In practice, when the airbag module of this embodiment is deployed, the airbag expands out of the side of the airbag module, passes through spokes of the steering wheel, and expands between the airbag module and the vehicle operator.

In yet another alternate embodiment, the steering apparatus is substantially similar to the preferred embodiment except that the steering wheel is a non-rotating hub type steering wheel. Due to the rotation of conventional steering wheel hubs, convention driver airbags are under the requirement to deploy at any rotational position of the steering wheel. However, such non-rotating type hub type steering wheels have been shown to have a safety advantage in that because the hub does not rotate, the employed airbag may be of an asymmetrical optimized shape. Further, such non-rotation of the steering wheel hub provides the benefit of having a stationary or non-rotating steering wheel mounted video display screen.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment. Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These and other features and advantages of the present invention will be set forth or will become more fully apparent in the description that follows. The features and advantages may be realized and obtained by means of the instruments and combinations particularly pointed out in the description that follows. Furthermore, the features and advantages of the invention may be learned by the practice of the invention or will be obvious from the description, as set forth hereinafter.

DESCRIPTION OF DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which:

FIG. 2 shows the airbag cover including a cover window, the display screen, and the retaining pocket of the apparatus of FIG. 1;

DETAILED DESCRIPTION OF THE INVENTION

Figure 1:
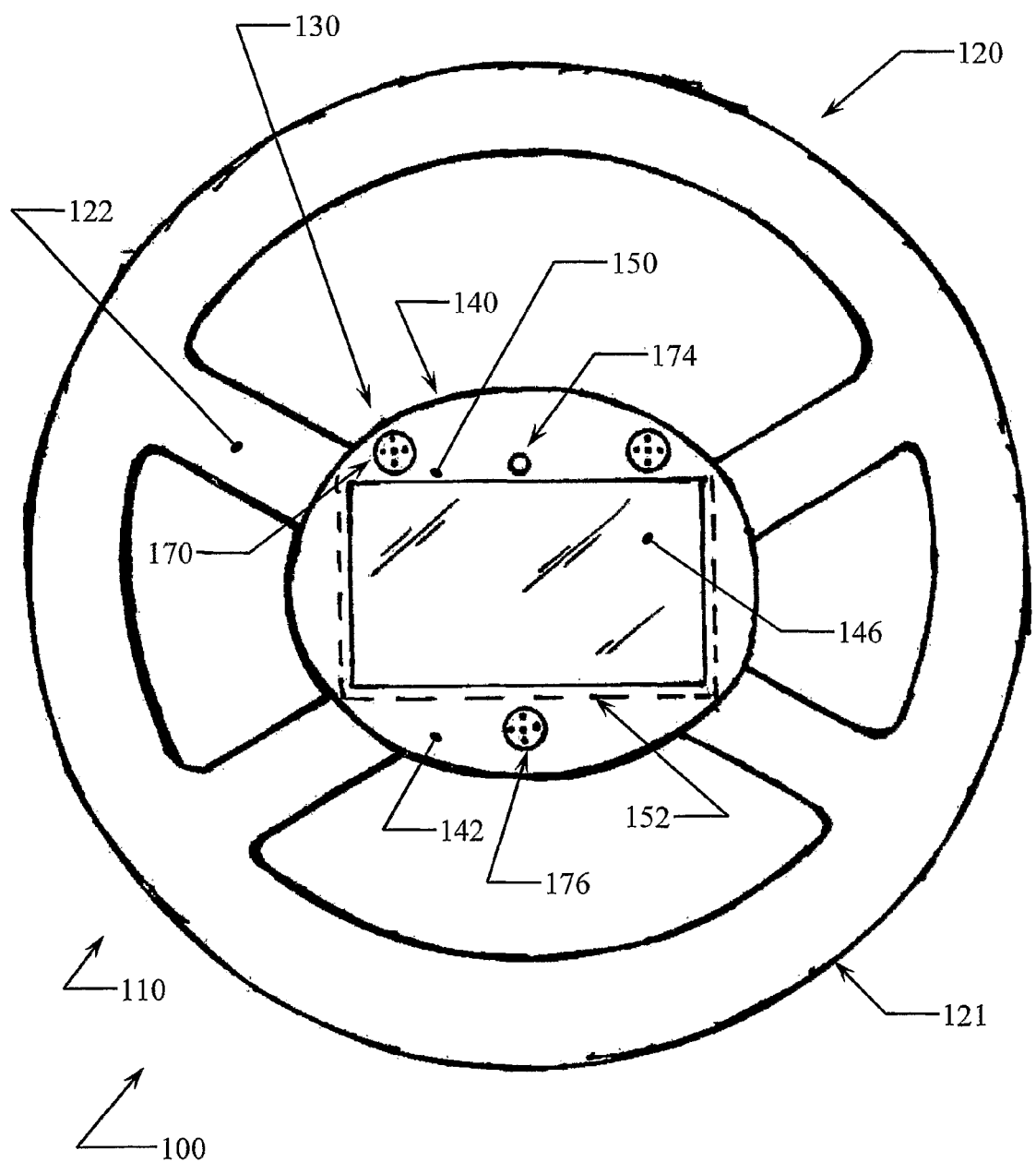
FIG. 1 illustrates a substantially front orthogonal view of the assembled steering apparatus of the preferred embodiment.
Figure 2:
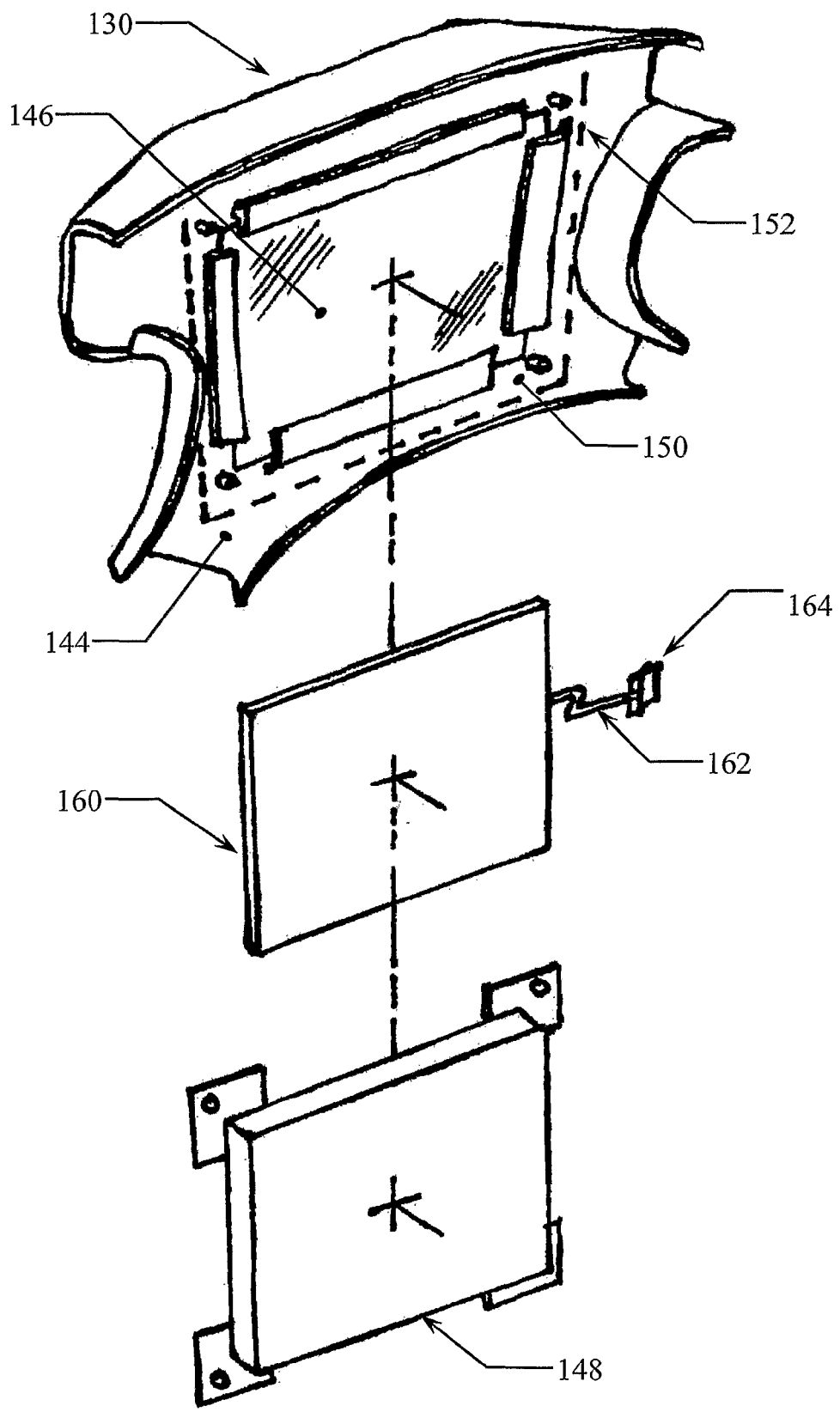
FIG. 2 illustrates a reverse exploded isometric view of a portion of the apparatus of FIG. 1, in particular

The present invention relates to an improved steering apparatus for vehicles. More particularly, the present invention relates to a steering wheel that provides for the control and information feedback of a variety or vehicle driving related items without requiring an operator of a vehicle to remove his hands from the steering wheel. Such ability to control vehicle functions and vehicle accessories significantly improves the safety of vehicle operation and provides for greater convenience to the vehicle operator.

It will be readily understood that the components of the present invention, as generally described and illustrated in the figures herein, could be arranged and designed in a wide variety of different configurations. Thus, the following more detailed description of the embodiments of the system and method of the present invention is not intended to limit the scope of the invention, but is merely representative of the presently preferred embodiments of the invention.

Referring now to FIGS. 1, 2, 23, and 24, steering apparatus 100 includes steering assembly 110 comprising steering wheel 120 having an airbag module 130 deployably mounted to steering wheel 120. Steering wheel 120 further comprises steering wheel rim 121 and steering wheel spokes 122. Airbag module 130 further comprises an airbag assembly 132 (not shown) having an airbag 133 and an airbag inflator, a preferably molded plastic module cover 140, a video display screen assembly 160, audio speakers 170, a camera 174, a microphone 176, and an electric control module (ECU) or microprocessor 180 (not shown). Video display screen assembly 160 is preferably a touch activatable glass substrate based video display screen but may alternatively be a touch activatable plastic or flexible substrate based video display screen such as an organic light emitting diode (OLED) type display screen, and includes a display screen electric connection cable 162 and electric connection cable plug 164. Video display screen 160, speakers 170, camera 174, and microphone 176, are electrically connected to ECU 180. Conventional vehicle mounted speakers may alternatively be used in combination with or instead of steering apparatus speakers 170. Display screen 160 is of such a size that it is readily visible by a person viewing the display screen 160 from a distance as is common from a vehicle operator to a vehicle steering wheel; for instance a distance of one to two feet. Display screen 160 may for instance, comprise a screen having a viewable area of 6"×8", 4"×6", 3"×5", 3"×4", 2"×3", or another suitable size either larger or smaller than the noted exemplary sizes. Module cover 140 includes an exterior front face 142 and a back surface 144. Cover 140 further includes at least one substantially transparent window 146 preferably insert molded in cover 140 so as to be visible when cover front face 142 is viewed as assembled to apparatus 100. Cover 140 further includes a preferably integrally molded video screen mounting pocket 148. Note that window 146 and pocket 148 may alternatively be mechanically fastened (or otherwise connected) to cover 140. Window 146 and mounting pocket 148 are preferably positioned such that window 146 and mounting pocket 148 are located with in a deployable flap 150 of cover 140, with deployable flap 150 having at least one tear seam 152. Airbag module 130 is assembled such that video display screen 160 is displayingly mounted into video screen mounting pocket 148 and module cover 140 is then attached to airbag assembly 132. Airbag module 130 is then connected to a steering wheel for assembly to a vehicle. When airbag module 130 is assembled to a vehicle steering wheel 120, cover window 146 provides a view of video display screen 160.

In practice, sound such as audible messages and voice commands are input by a user into microphone 176 and sound such as music and audible voice warnings in a language of a user's preference are emitted from speakers 170. Further in practice, touch activatable display screen 160 is used to send commands for a variety of vehicle functions and accessories by means of touching "virtual control buttons" on a variety of display menus as will be further described hereinafter. Thus it is intended that the steering apparatus will respond in a like manner regardless of whether a virtual control button is touch or a voice command corresponding to the virtual control button is audibly spoken. Also in practice, when improved steering apparatus 100 is deployed in a vehicle, such as when anticipating a crash or during a crash, while the glass substrate of video display screen 160 may crack and may even fragment, substantially all of display screen 160 and substantially any fragmented pieces of display screen 160 remain substantially contained in video screen mounting pocket 148. Further, module cover 140 is adapted such that deployed flap 150 of cover 140 remains hingedly connected to cover 150.

Figure 3:
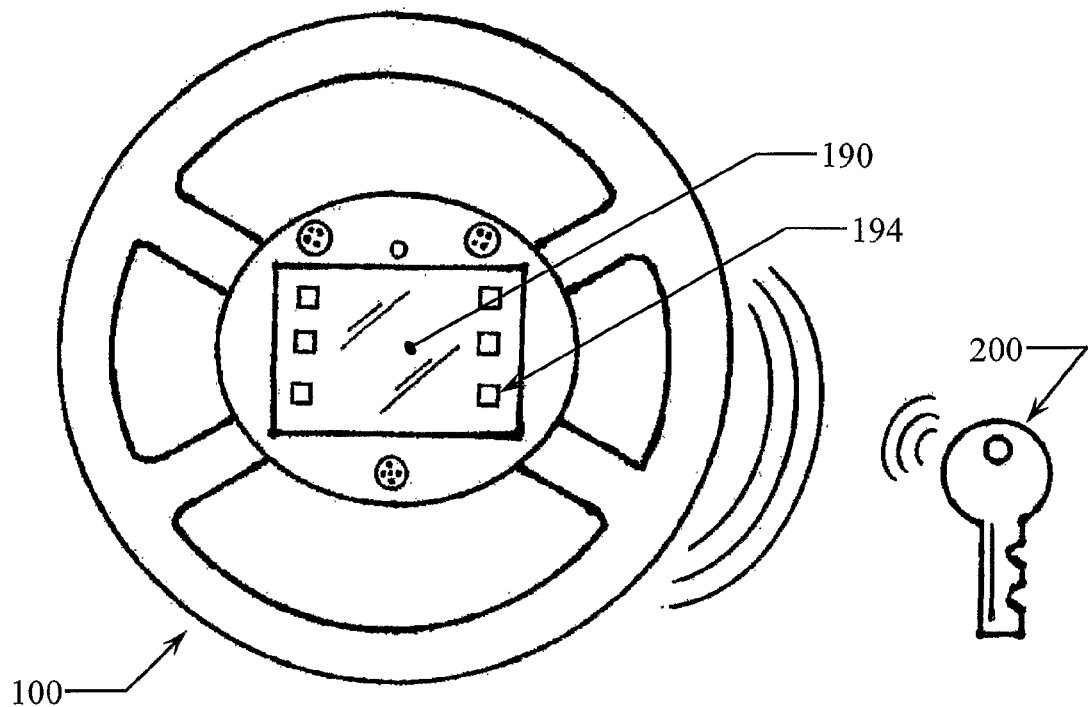
FIG. 3 illustrates a substantially front orthogonal view of the steering apparatus of the preferred embodiment and a side view of a key having an RFID emission capability.

FIG. 3 shows a view of improved steering apparatus 100 and a radio frequency identification (RFID) data emitting key 200. Steering apparatus 100 includes a generic function control menu display 190 having a plurality of "virtual control buttons" 194. A virtual control button, as used herein, shall be understood to mean a predefined area of a touch activatable electronic display screen that when touched in the predefined area, will cause a change in the display screen and will preferably define a command, the commanding of which, results in a vehicle function or accessory to be activated. Such virtual control button shall be understood to be distinct from the more conventional electromechanical buttons commonly found in convention vehicle steering wheels. Steering apparatus 190 is preferably adapted to display a variety of function control menu displays 190, wherein each of menus 190 include at least one virtual control button 194 and wherein each of menus 190 pertain to a logically related group of functions such as a group of vehicle entertainment system functions including for instance radio, CD, and DVD systems functions, vehicle environmental control system functions including for instance heating, defrosting, and air conditioning system functions, vehicle operation monitoring system functions including for instance speedometers, tachometers, and oil pressure indicator functions, vehicle accessories functions including for instance windshield wipers, turn signal indicators, and door lock functions, vehicle control functions including for instance vehicle cruise control, vehicle gear shifting or drive control, and vehicle braking functions, vehicle video input system functions including for instance live backup video feed, live blind spot video feed, and live rear vehicle cabin area video feed functions, and vehicle warning and information reception system functions including for instance DSRC received data systems, DSRC transmitted data systems, and vehicle GPS system functions. While it is intended that apparatus 100 will be available with numerous preprogrammed function control menus 190 that provide for the control of a variety of vehicle functions, devices, and accessories, it is also intended that a user may modify or create one or more functional control menus 190 as adapted to the user's personal preference of virtual control button 190 location, look, and feel.

In practice, when a user brings key 200 in near proximity to a vehicle having steering apparatus 100 installed in said vehicle, for instance when a user unlocks said vehicle using key 200 or when user starts said vehicle using key 200, the display screen 160 of apparatus 100, will automatically display a customized higher level functional control menu 190 of the user's predefined choice. Also in practice, user information is gather via camera 174 microphone 176, and electrically sent to ECU 180. Further in practice, it is contemplated that alternatively, upon recognition of a predetermined user identity, a predetermined corresponding customized display will be automatically displayed upon the detection of a select user image, a user voice, a user retinal scan, or a user fingerprint identification.

Figure 4:
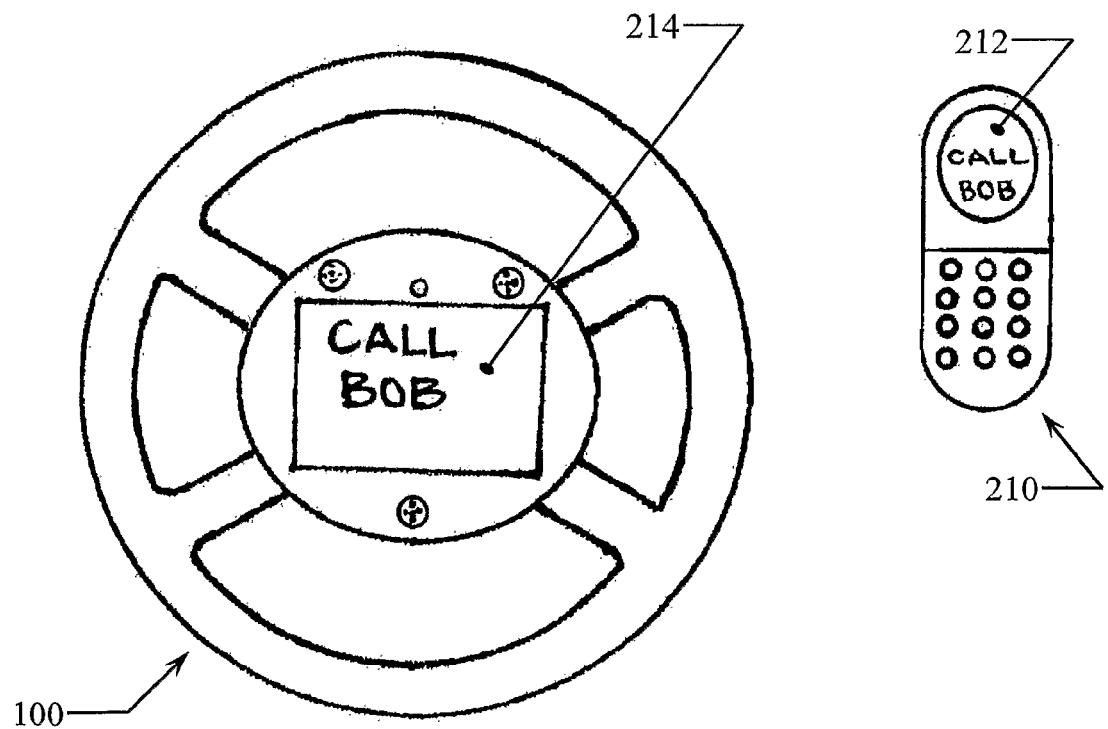
FIG. 4 illustrates a substantially front orthogonal view of the steering apparatus of the preferred embodiment and a front view of an open cellular phone, the screen of the steering apparatus and the screen of the cellular phone are shown as displaying substantially the identical synchronized functional display.

FIG. 4 shows a view of improved steering apparatus 100 and a cellular phone 210. Cellular phone 210 is shown displaying a function cellular phone display menu 212 such as is common to a cellular phone in the sending and receiving of cellular phone calls, and video display screen 160 of steering apparatus 100 is shown as displaying a substantially identical but larger functional phone display menu 214. Inasmuch as it is generally desirable to minimize the learning curve associated with learning to use a new device or apparatus, in practice, functional phone display menu 214 of video display 160, functions to control cellular phone 210 via voice or touch activated commands in substantially the same method as a user would otherwise control cellular phone 210. It is contemplated that steering apparatus 100 will be programmed and adapted such that steering apparatus 100 will automatically wirelessly recognize a variety of commonly used non-vehicle-embedded or portable electronic devices such as cellular phones, pagers, and personal digital assistants (PDAs). It is intended that the means of wireless connection between steering apparatus 100 and cellular phone 210 or like portable device will be a bluetooth wireless connection. It is an intended benefit of this invention, that the use of steering apparatus 100 in combination with cellular phone 210 or like portable device will be simply, readily understood, and of very low learning requirements for a general public type user.

Figure 5:
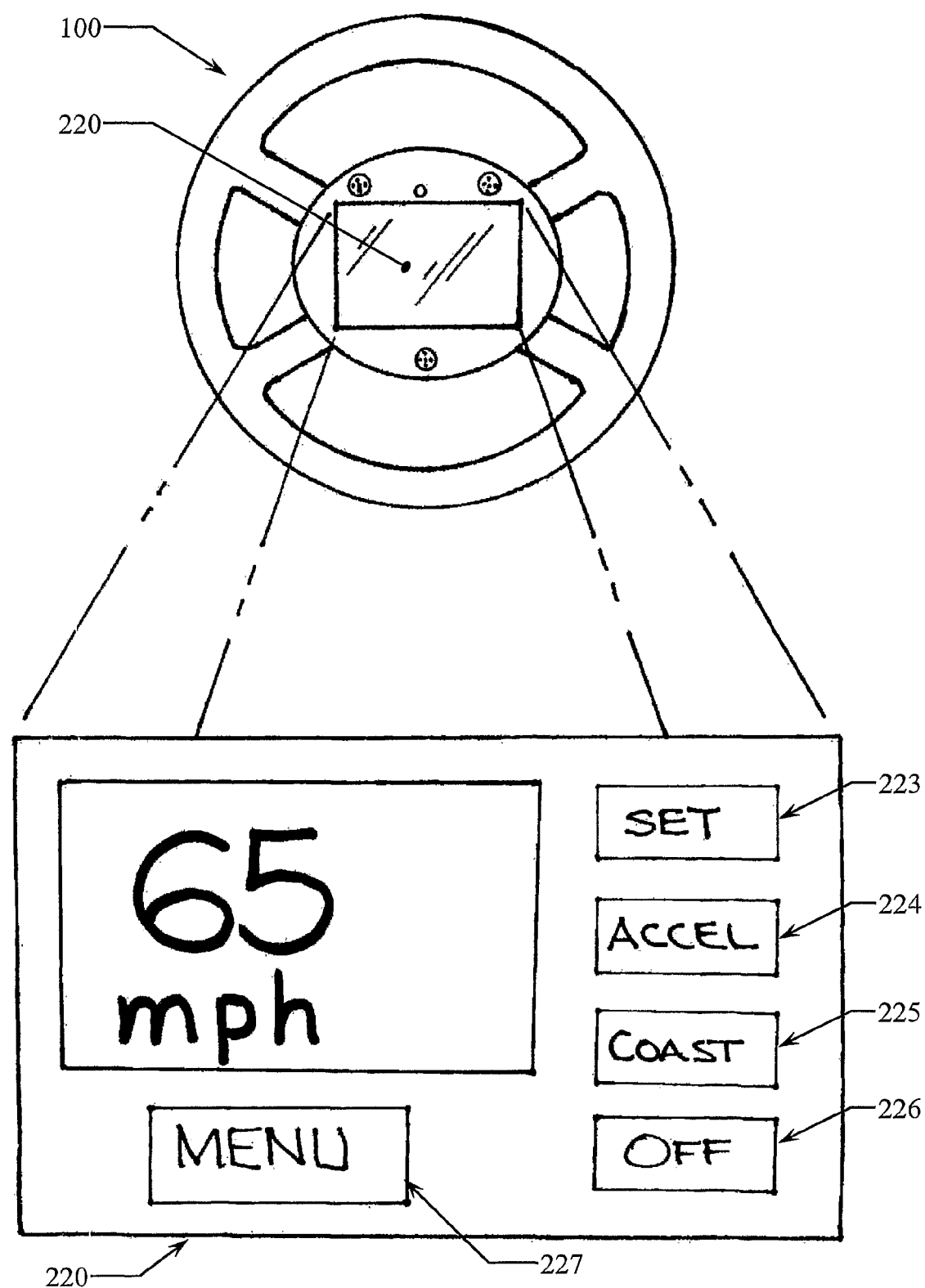
FIG. 5 illustrates a substantially front orthogonal view of the steering apparatus of the preferred embodiment and an enlarged view of the display of the apparatus shown displaying a cruise control type menu display.

FIG. 5 shows a view of improved steering apparatus 100 with video display screen 160 of apparatus 100 showing cruise control menu 220 and a corresponding enlarged view of menu 220. Menu 220 is shown as having a display feedback area 222, a "Set" virtual control button 223, an "Accel" virtual control button 224, a "Coast" control button 225, an "Off" virtual control button 226, and a "Menu" virtual control button 227. In practice, with steering apparatus 100 functionally installed in a vehicle, corresponding touch or voice commands of the various virtual control buttons function to effect the speed of said vehicle. Additionally, the "Menu" virtual control button functions to return display screen 160 to the display of a higher level function control menu 190. It shall be noted that depicted virtual control buttons of menu 220 shall be considered exemplary only and that it will be readily recognized that a person having ordinary skill in the art would readily appreciate a variety of different virtual control buttons and features.

Figure 6:
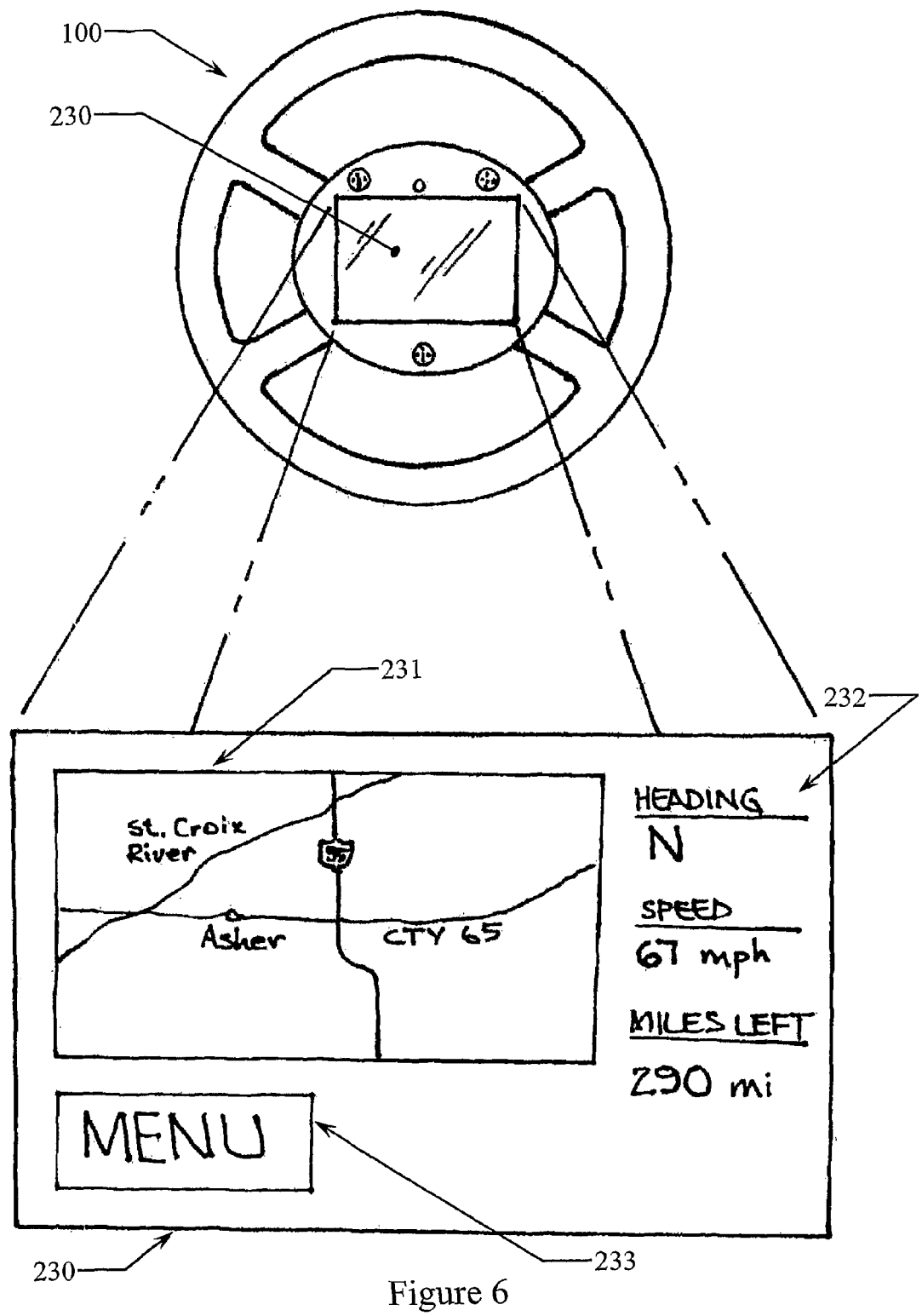
FIG. 6 illustrates a substantially front orthogonal view of the steering apparatus of the preferred embodiment and an enlarged view of the display of the apparatus shown displaying a global positioning system type menu display.

FIG. 6 shows a view of improved steering apparatus 100 with video display screen 160 of apparatus 100 showing global positioning menu 230 and a corresponding enlarged view of menu 230. Menu 230 is shown as having a map display area 231, various heading, speed, and mileage data 232, and a "Menu" virtual control button 223. In practice, with steering apparatus 100 functionally installed in a vehicle, corresponding touch or voice commands of the various virtual control buttons function to effect a determination of the positioning and speed and direction of said vehicle. Additionally, the "Menu" virtual control button functions to return display screen 160 to the display of a higher level function control menu 190. It shall be noted that depicted virtual control button and displays of menu 230 shall be considered exemplary only and that it will be readily recognized that a person having ordinary skill in the art would readily appreciate a variety of different virtual control buttons and features.

Figure 7:
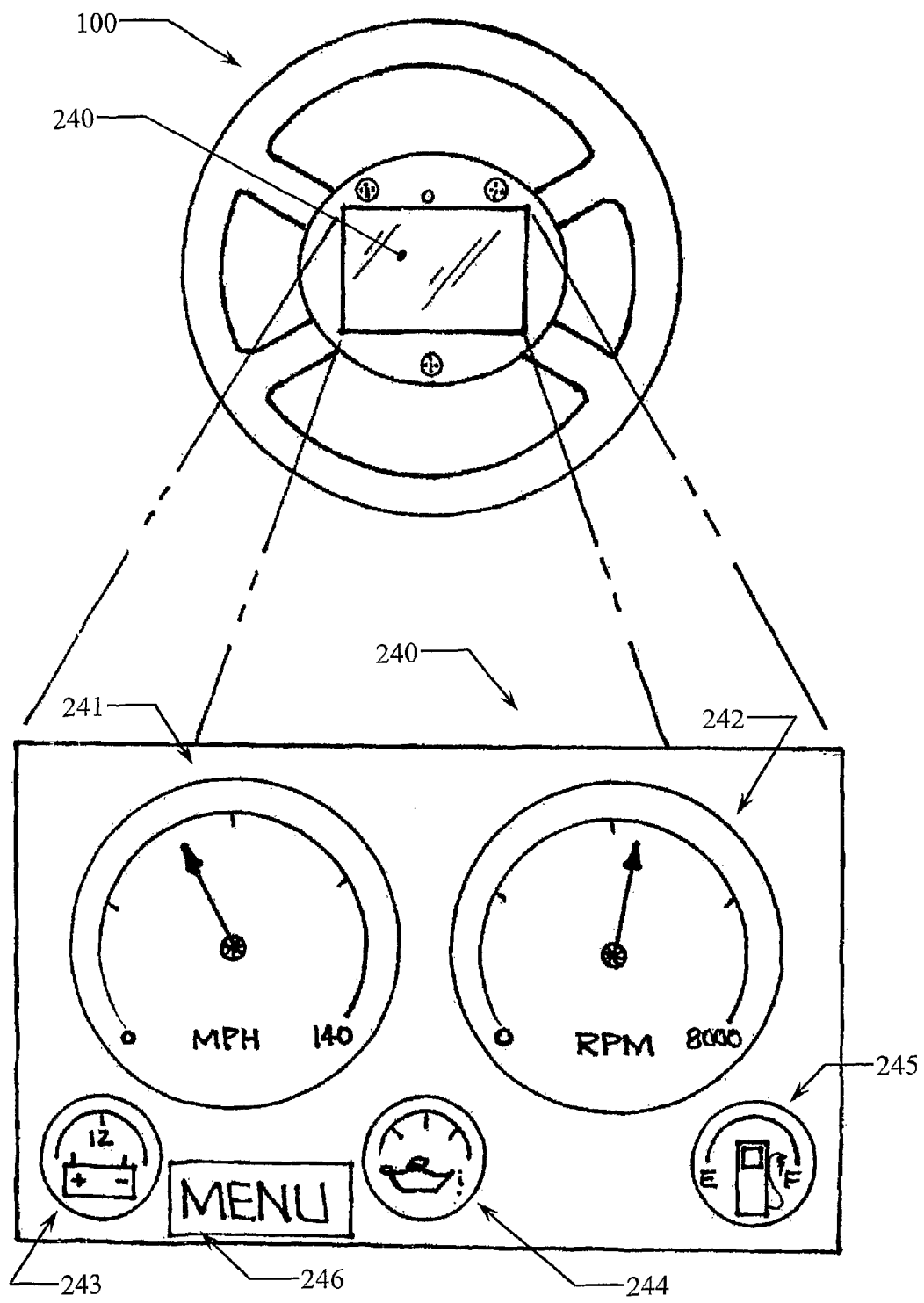
FIG. 7 illustrates a substantially front orthogonal view of the steering apparatus of the preferred embodiment and an enlarged view of the display of the apparatus shown displaying a vehicle monitoring gauges type menu display.

FIG. 7 shows a view of improved steering apparatus 100 with video display screen 160 of apparatus 100 showing vehicle monitoring instrument and gauges menu 240 and a corresponding enlarged view of menu 240. Menu 240 is shown as having a virtual speedometer 241, a virtual tachometer 242, a virtual battery gauge 243, a virtual oil pressure gauge 244, a virtual fuel gauge 245, and a "Menu" virtual control button 246. In practice, with steering apparatus 100 functionally installed in a vehicle, corresponding touch or voice commands of the various virtual control buttons function to effect an assessment and monitoring of various vehicle performance parameters. Additionally, the "Menu" virtual control button functions to return display screen 160 to the display of a higher level function control menu 190. It shall be noted that depicted virtual control button and displays of menu 240 shall be considered exemplary only and that it will be readily recognized that a person having ordinary skill in the art would readily appreciate a variety of different virtual control buttons and features.

Figure 8:
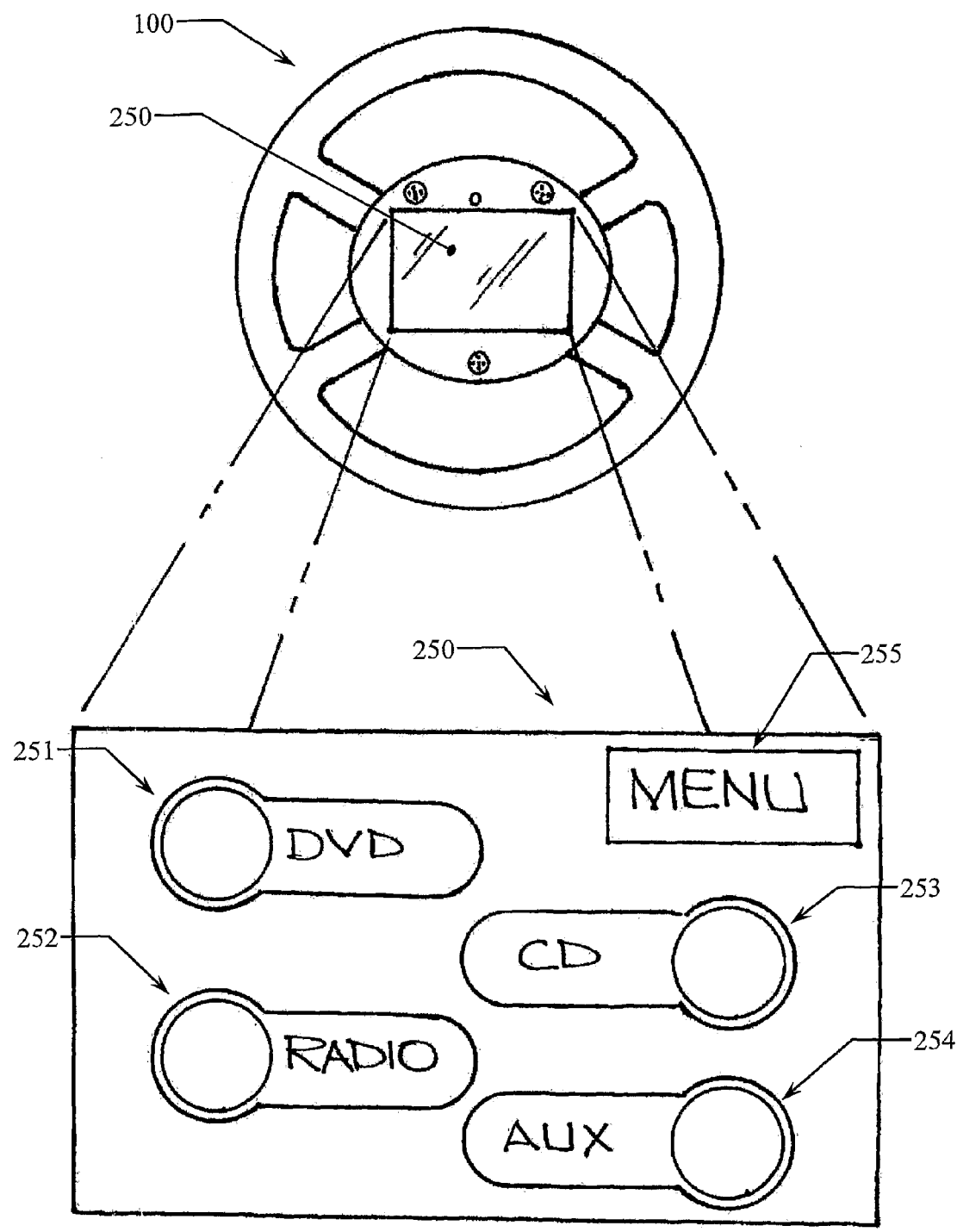
FIG. 8 illustrates a substantially front orthogonal view of the steering apparatus of the preferred embodiment and an enlarged view of the display of the apparatus shown displaying entertainment system control type menu display.

FIG. 8 shows a view of improved steering apparatus 100 with video display screen 160 of apparatus 100 showing vehicle entertainment system menu 250 and a corresponding enlarged view of menu 250. Menu 250 is shown as having a "DVD" (digital video disc) virtual control button 251, a "radio" virtual control button 252, a "CD" (compact disc) virtual control button 253, an "AUX" (auxiliary) virtual control button 254, and a "Menu" virtual control button 255. In practice, with steering apparatus 100 functionally installed in a vehicle, corresponding touch or voice commands of the various virtual control buttons function to effect control of various vehicle entertainment systems. Additionally, the "Menu" virtual control button functions to return display screen 160 to the display of a higher level function control menu 190. It shall be noted that depicted virtual control button and displays of menu 250 shall be considered exemplary only and that it will be readily recognized that a person having ordinary skill in the art would readily appreciate a variety of different virtual control buttons and features.

Figure 9:
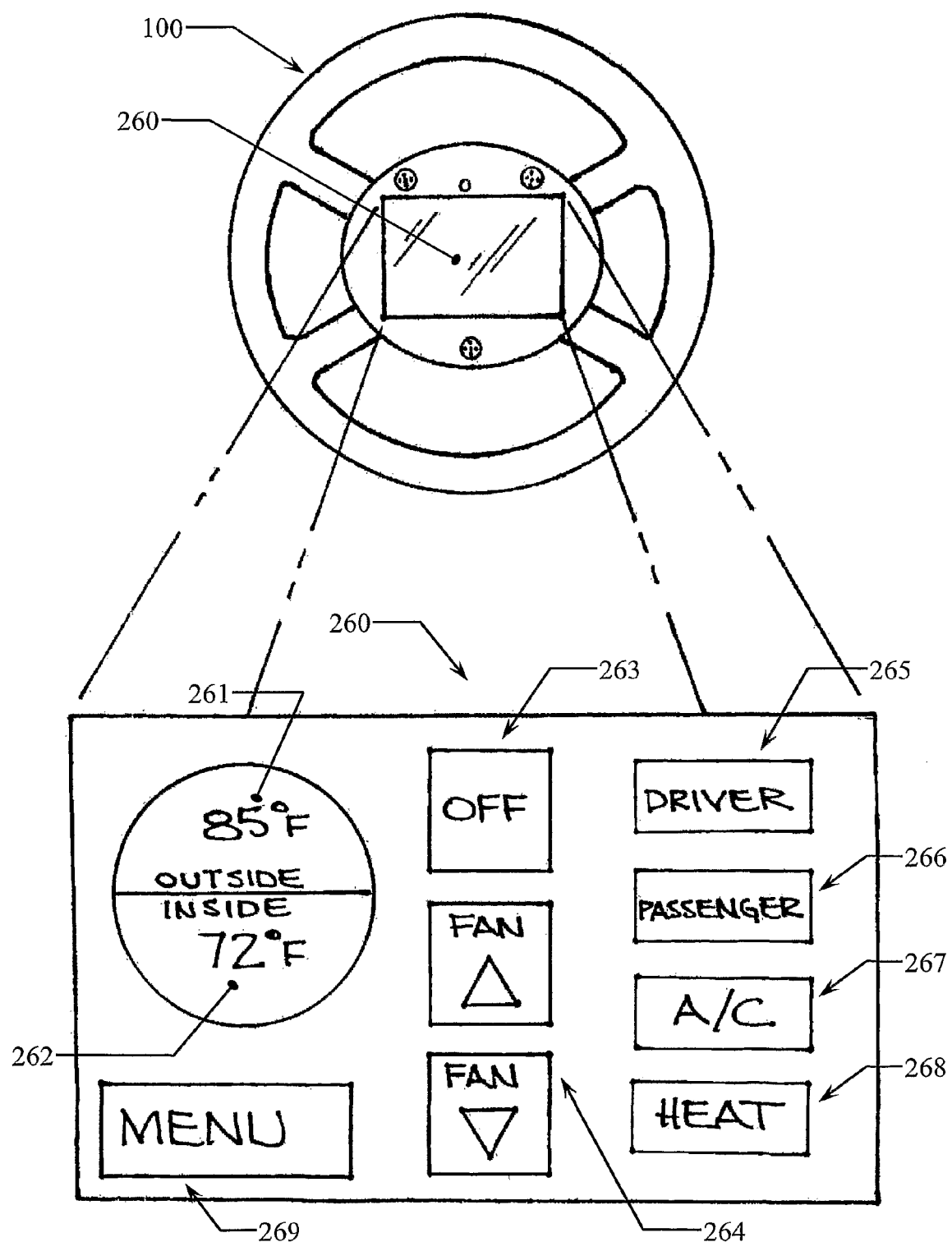
FIG. 9 illustrates a substantially front orthogonal view of the steering apparatus of the preferred embodiment and an enlarged view of the display of the apparatus shown displaying a vehicle environmental control type menu display.

FIG. 9 shows a view of improved steering apparatus 100 with video display screen 160 of apparatus 100 showing vehicle environmental control system menu 260 and a corresponding enlarged view of menu 260. Menu 260 is shown as having an outside vehicle temperature indication area 261, an inside vehicle temperature indication area 262, an "off" virtual control button 263, "fan" virtual control buttons 264, a "driver" (driver's side) virtual control button 265, a "passenger" (passenger side) virtual control button 266, an "AC" (air conditioning) virtual control button 267, a "heat" virtual control button 268, and a "Menu" virtual control button 269. In practice, with steering apparatus 100 functionally installed in a vehicle, corresponding touch or voice commands of the various virtual control buttons function to effect control of various vehicle environmental systems. Additionally, the "Menu" virtual control button functions to return display screen 160 to the display of a higher level function control menu 190. It shall be noted that depicted virtual control button and displays of menu 260 shall be considered exemplary only and that it will be readily recognized that a person having ordinary skill in the art would readily appreciate a variety of different virtual control buttons and features.

Figure 10:
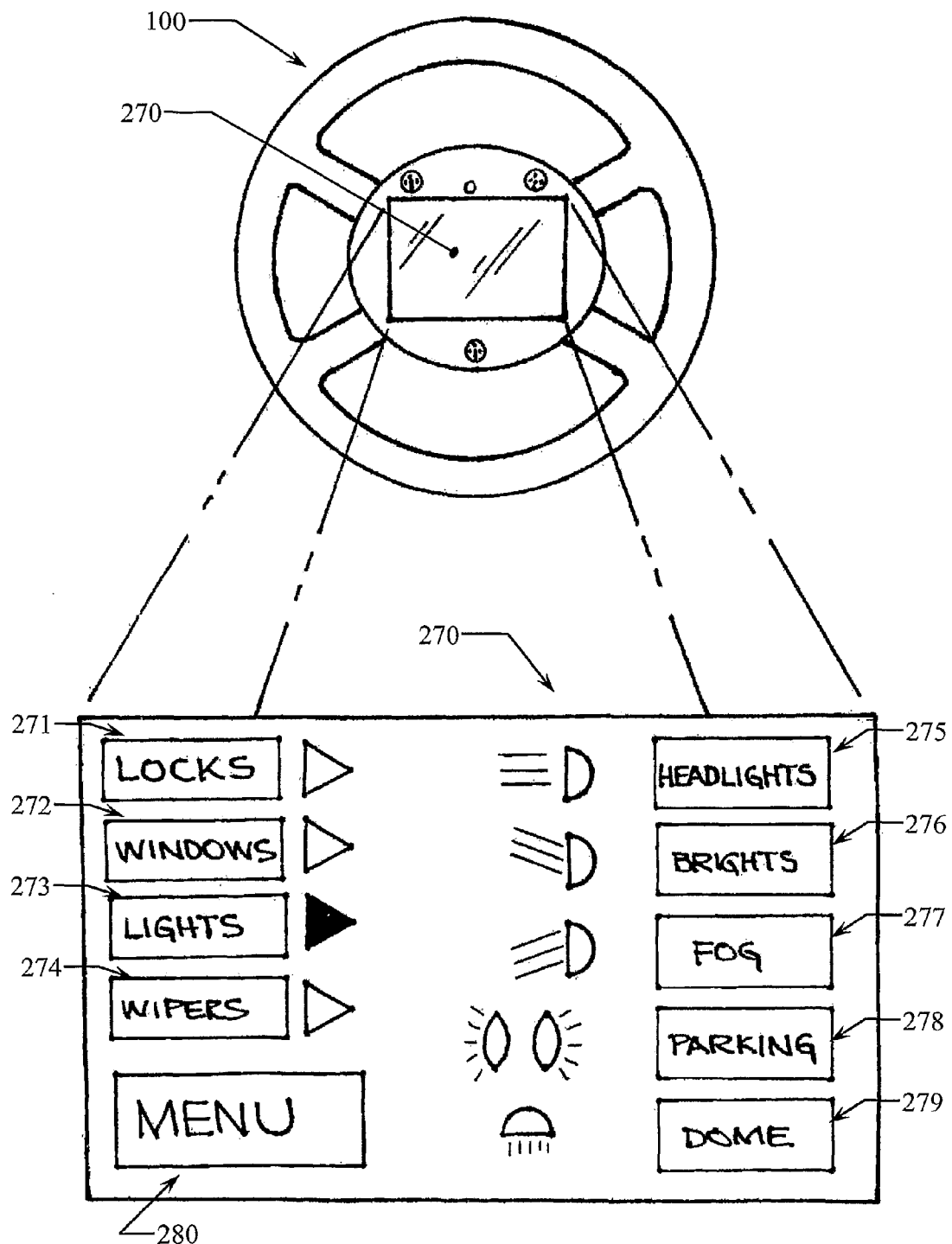
FIG. 10 illustrates a substantially front orthogonal view of the steering apparatus of the preferred embodiment and an enlarged view of the display of the apparatus shown displaying a plurality of conventional vehicle accessory controls type menu display, including the control of vehicle locks, windows, and lights.
Figure 22:
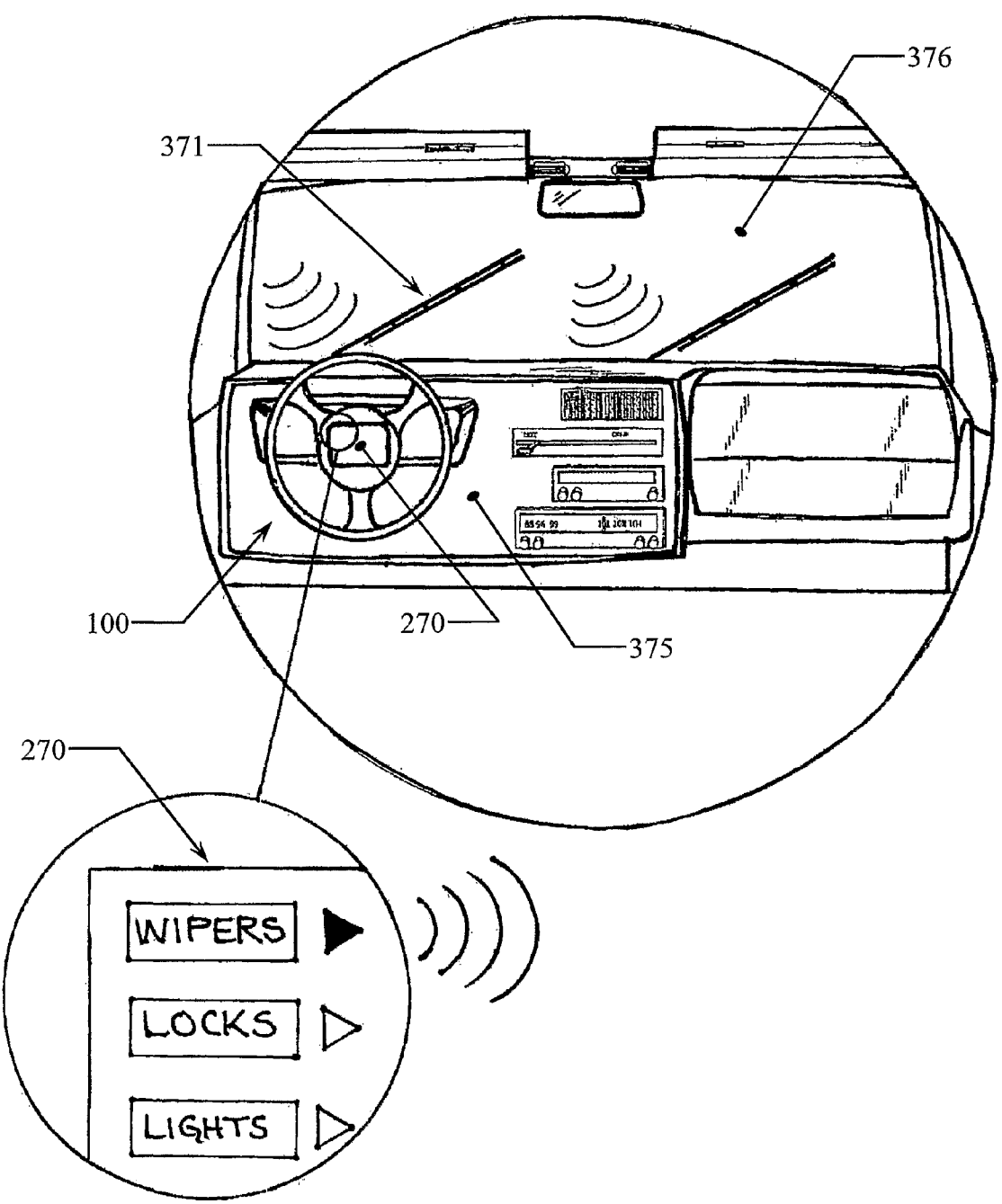
FIG. 22 illustrates a view from a vehicle cabin looking forward with the vehicle having the steering apparatus of the preferred embodiment installed in the vehicle and with windshield wipers of the vehicle being actuated in response to the reception of a wireless actuation signal and an enlarged view of a portion of the screen of the preferred embodiment displaying a corresponding accessory wireless control signal transmission type menu.
Figure 23:
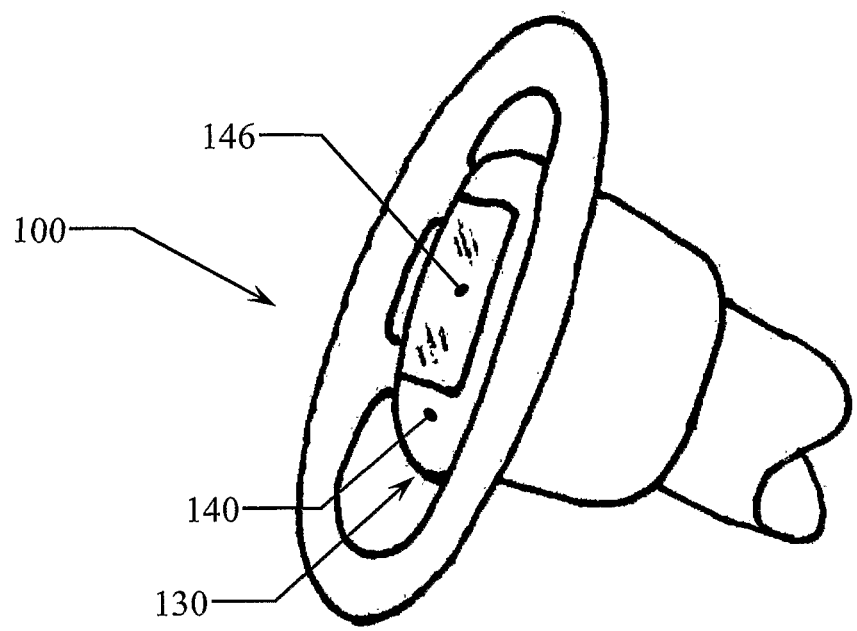
FIG. 23 illustrates a side isometric view of the preferred embodiment of the steering apparatus with the steering apparatus shown in a predeployment position.
Figure 24:
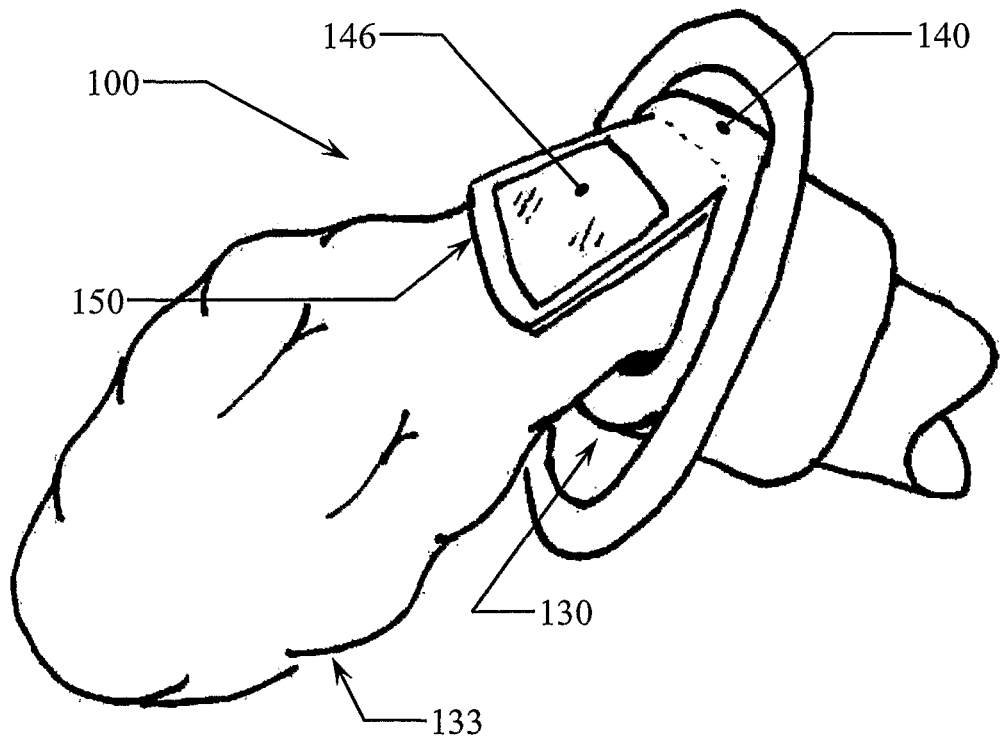
FIG. 24 illustrates a side isometric view of the preferred embodiment of the steering apparatus with the steering apparatus shown in the process of deployment and the display screen mounted to the flap of the airbag module and the flap shown moving from a closed position to an open position.

FIG. 10 shows a view of improved steering apparatus 100 with video display screen 160 of apparatus 100 showing vehicle miscellaneous vehicle accessory control system menu 270 and a corresponding enlarged view of menu 270. Menu 270 is shown as having a "locks" virtual control button 271, a "windows" virtual control button 272, a "lights" virtual control button 273, a "wipers" virtual control button 274, a "headlights" virtual control button 275, a "brights" (bright headlights) virtual control button 276, a "fog" (fog lights) virtual control button 277, a "parking" (park lights) virtual control button 278, a "dome" (dome light) virtual control button 279, and a "Menu" virtual control button 280. In practice, with steering apparatus 100 functionally installed in a vehicle, corresponding touch or voice commands of the various virtual control buttons function to effect control of various vehicle accessories. Additionally, the "Menu" virtual control button functions to return display screen 160 to the display of a higher level function control menu 190. Further, FIG. 22 shows a view of improved steering apparatus 100 mounted in a vehicle with video display screen 160 of apparatus 100 showing vehicle miscellaneous vehicle accessory control system menu 270 and a corresponding enlarged view of menu 270, a portion of the vehicle interior including the vehicle dash board 375, the vehicle windshield 376, and vehicle windshield wipers 371. Display menu 270 is shown displaying the virtual control buttons of display 270 in a user preferred rearranged pattern. Also, apparatus 100 is displayed as wirelessly sending a windshield wiper 371 control signal, and windshield wipers 371 are displayed as wirelessly receiving a windshield wiper 371 control signal. In practice, with steering apparatus 100 functionally installed in a vehicle, corresponding touch or voice commands of the various virtual control buttons function to wirelessly effect control of windshield wipers 371 and like vehicle accessories. It shall be noted that depicted virtual control button and displays of menu 270 shall be considered exemplary only and that it will be readily recognized that a person having ordinary skill in the art would readily appreciate a variety of different virtual control buttons and features.

Figure 11:
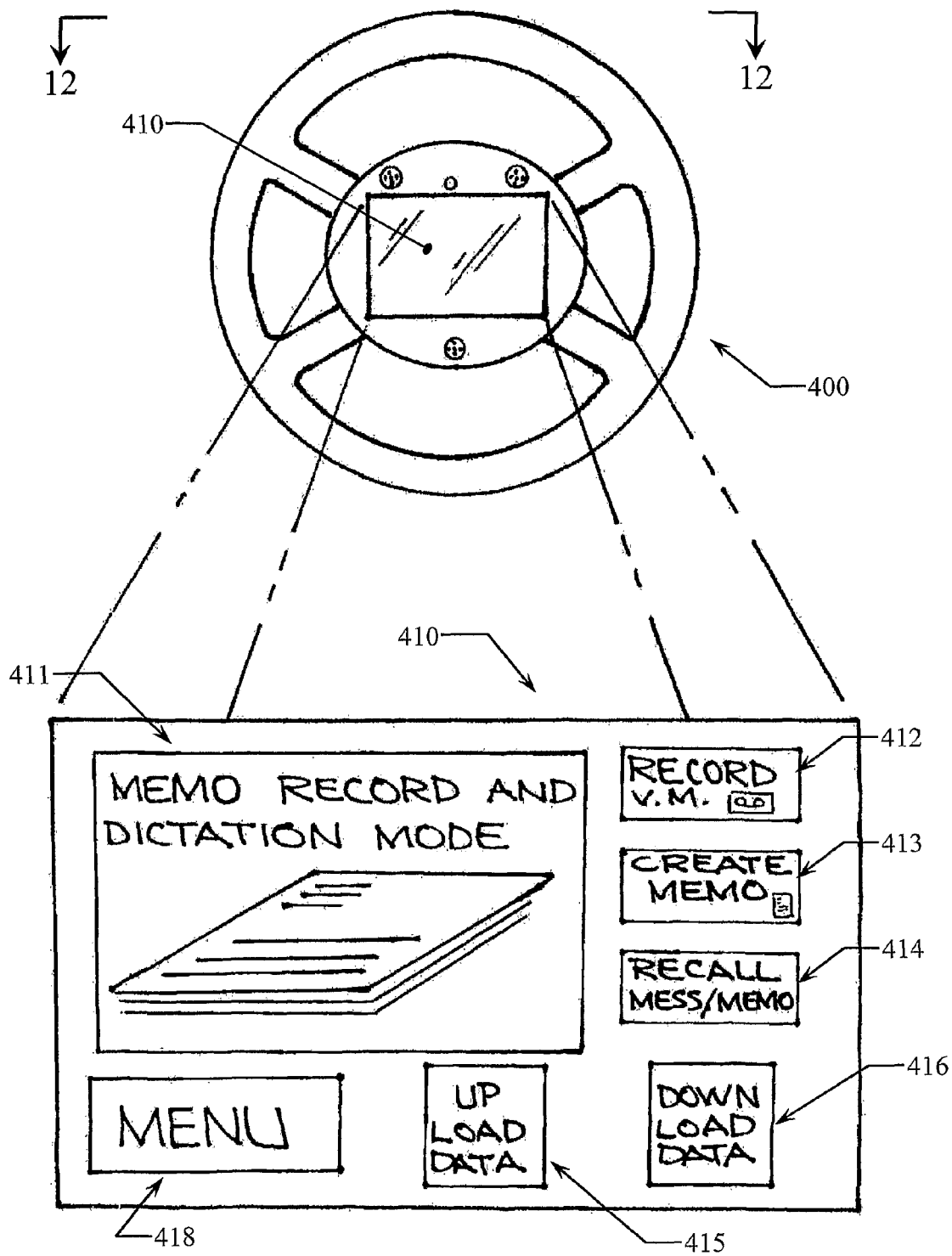
FIG. 11 illustrates a substantially front orthogonal view of the steering apparatus of an alternate embodiment and an enlarged view of the display of the apparatus shown displaying a memo record and dictation control type menu display.
Figure 12:
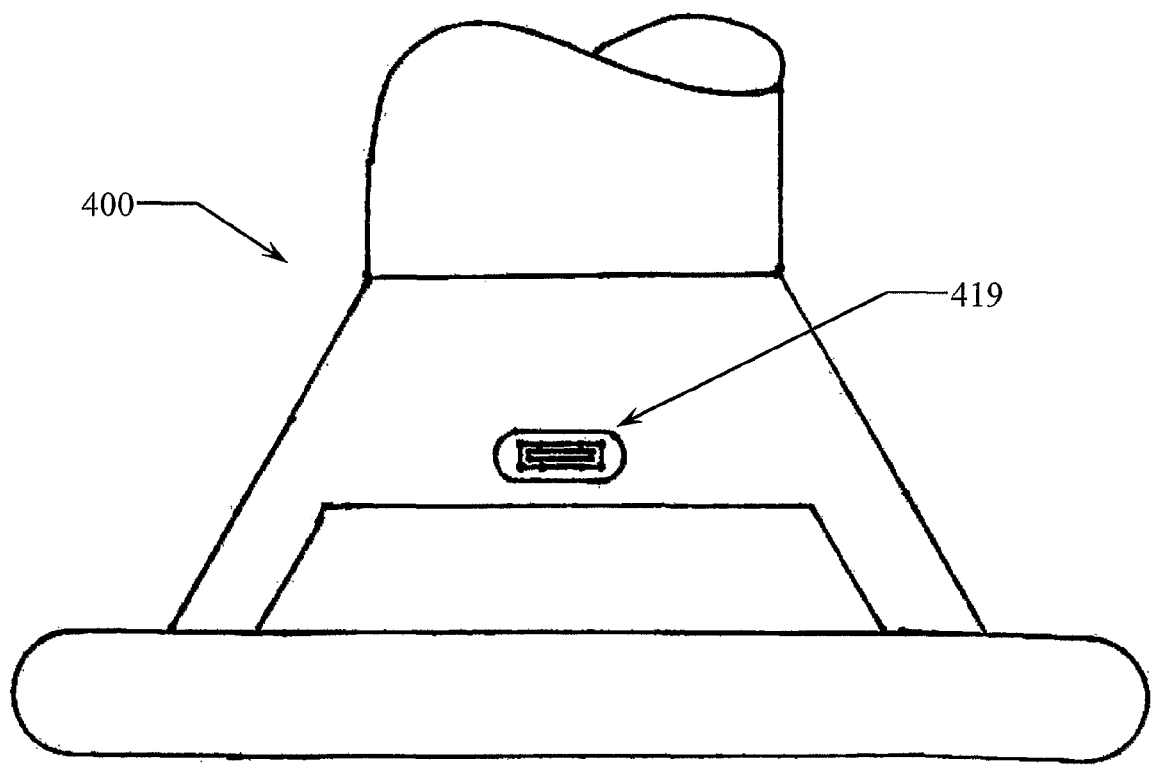
FIG. 12 illustrates a top view of the apparatus shown in FIG. 11, a universal serial bus port is shown on the steering apparatus.

FIG. 11 shows a view of improved steering apparatus 400 with video display screen 460 of apparatus 400 showing memo record and dictation control system menu 410 and a corresponding enlarged view of menu 410. Apparatus 400 is substantially similar to apparatus 100 except that apparatus 400 includes menu 410. Menu 410 is shown as having a memo display area 411, a "record v. m. (voice message)" virtual control button 412, a "create memo" virtual control button 413, a "recall message/memo" virtual control button 414, an "upload data" virtual control button 415, a "download data" virtual control button 416, and a "Menu" virtual control button 418. FIG. 12 shows a top substantially orthographic view of apparatus 400, including universal serial bus (USB) port 419. In practice, with steering apparatus 100 functionally installed in a vehicle, corresponding touch or voice commands of the various virtual control buttons function to effect the recording of voice messages and the creation of digital memos or letters and to effect the selective recall of previously recorded messages and created memos on demand. Further, by inserting a memory device such as a jump drive or flash memory type memory stick into USB port 419, an apparatus user may readily upload or download previously recorded messages and memos. Menu 410 also includes a "Menu" virtual control button to effect the return display screen 460 to the display of a higher level function control menu. A benefit in addition to the convenience of such message recording and such memo creation and the recall and playback of the same is the increased vehicle operational safety due to the elimination of the need for an apparatus user to remove his hands from the steering wheel in order to perform message and memo functions. It shall be noted that depicted virtual control button and displays of menu 410 shall be considered exemplary only and that it will be readily recognized that a person having ordinary skill in the art would readily appreciate a variety of different virtual control buttons and features.

Figure 13:
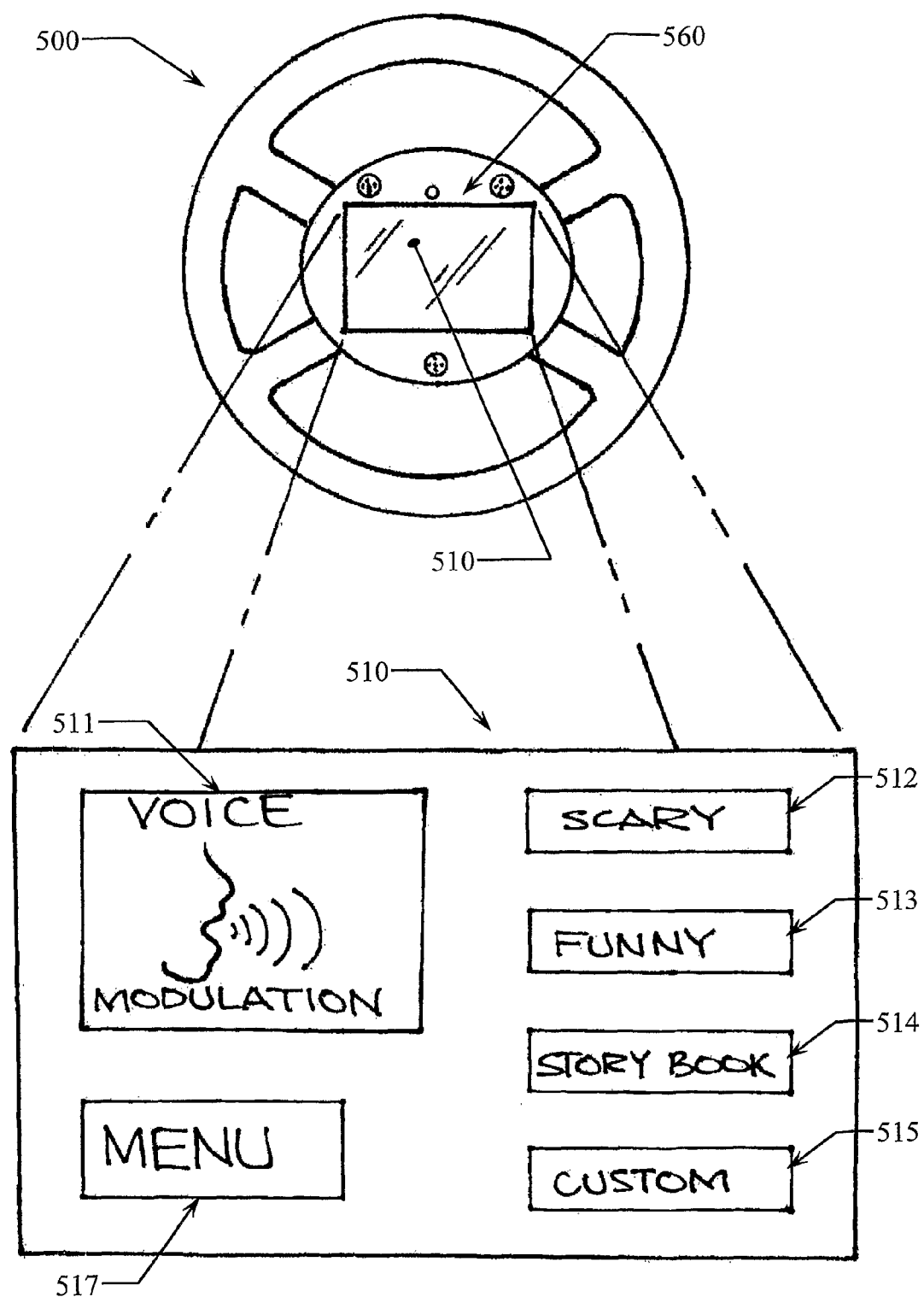
FIG. 13 illustrates a substantially front orthogonal view of the steering apparatus of the preferred embodiment and an enlarged view of the display of the apparatus shown displaying a voice modulation control type menu display.

FIG. 13 shows a view of improved steering apparatus 500 with video display screen 560 of apparatus 500 showing voice modulation control system menu 510 and a corresponding enlarged view of menu 510. Apparatus 500 is substantially similar to apparatus 100 except that apparatus 500 includes menu 510. Menu 510 is shown as having a voice modulation mode indication area 511, a "scary voice" virtual control button 512, a "funny voice" virtual control button 513, a "story book character voice" virtual control button 514, an "customized voice" virtual control button 515, and a "Menu" virtual control button 517. In practice, with steering apparatus 500 functionally installed in a vehicle, corresponding touch or voice commands of the various virtual control buttons function to effect the broadcast or replication of an apparatus user's voice in a modulated or altered voice. It is noted that voice modulation has long been known and is commercially available in numerous devices including telephones. The advantage of having voice modulation in apparatus 500 is that vehicle passengers, especially child vehicle passenger, may be amused or otherwise have their attention captured by the use of such voice modulation. By means of using the "storybook character voice" mode, a user may for instance speak in a voice modulated to sound like one of many different predetermined voice styles that may correspond to a storybook that may be included in the vehicle. Menu 510 also includes a "Menu" virtual control button to effect the return of display screen 560 to the display of a higher level function control menu. It shall be noted that depicted virtual control button and displays of menu 510 shall be considered exemplary only and that it will be readily recognized that a person having ordinary skill in the art would readily appreciate a variety of different virtual control buttons and features.

Figure 14:
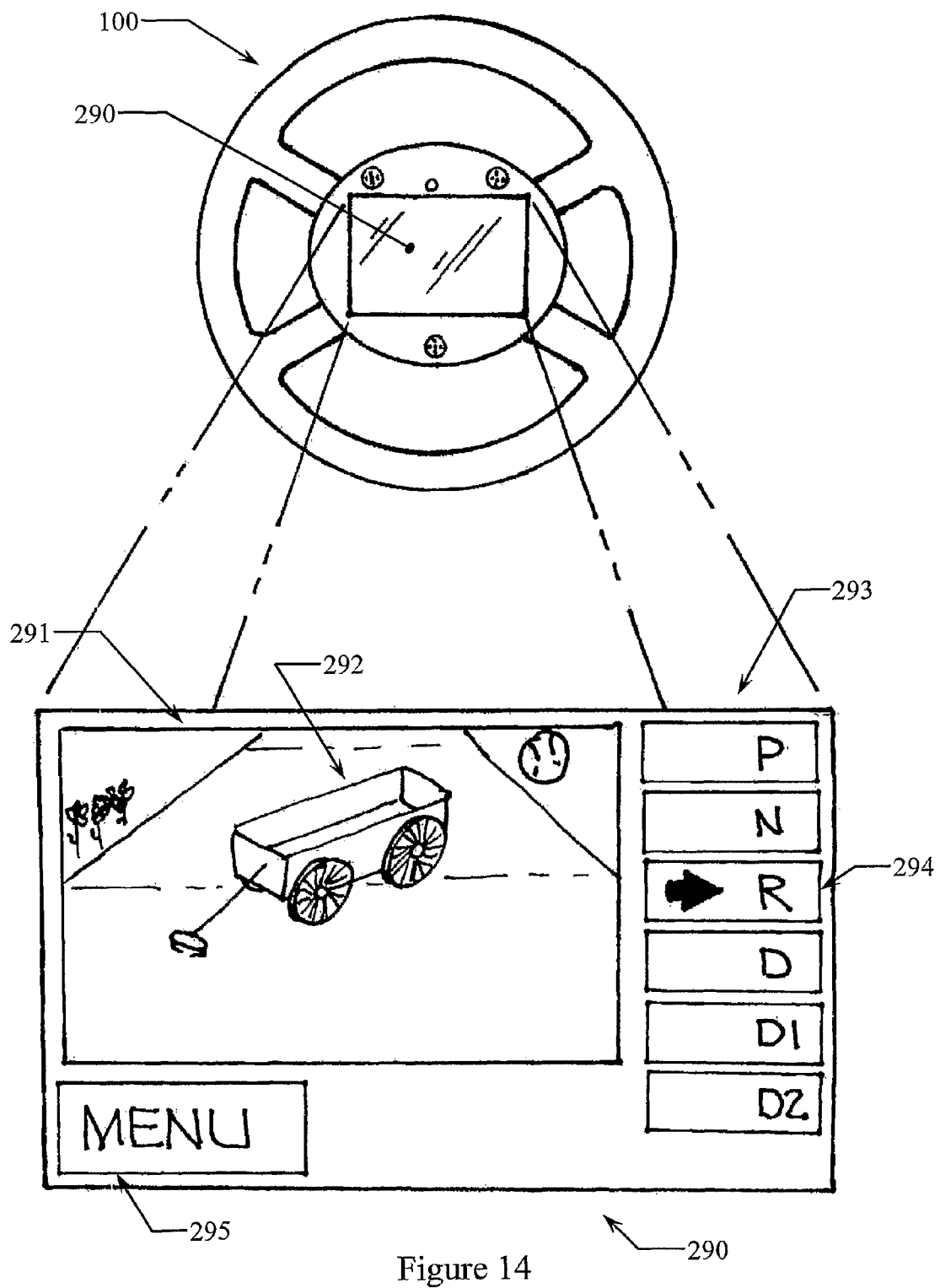
FIG. 14 illustrates a substantially front orthogonal view of the steering apparatus of the preferred embodiment and an enlarged view of the display of the apparatus shown displaying a live video feed of a vehicle backup field of view type menu display.

FIG. 14 shows a view of improved steering apparatus 100 with video display screen 160 of apparatus 100 showing rearward field of view display menu 290 and a corresponding enlarged view of menu 290. Menu 290 is shown as having a rearward field of view live video play area 291, a child's wagon type obstruction 292 in video play are 291, vehicle drive gears virtual control buttons in general 293, selected reverse drive gear virtual control button 294, and a "Menu" virtual control button 295. In practice, with steering apparatus 100 functionally installed in a vehicle, a user may effect vehicle drive gear selection by touching or speaking voice commands corresponding to the desired drive gear. Optionally, a manual gear shift lever is manipulated to select a drive gear, while drive gear virtual control buttons 293 indicate the gear that is currently selected. Upon the selection of reverse gear 294, video display area 291 automatically initiates a display of live or real time video feed of the rearward field of view of said vehicle. Apparatus 100 also provides for a manual selection of the display of video area 291. In the sample backup video 291 of menu 290, an obstruction defining a child's wagon 292 is displayed. In this instance, a vehicle operator, upon seeing obstruction 292, would have advance warning so as to avoid the obstacle in the vehicle rearward path. Vehicles not similarly equipped would be more likely to collide with obstacle 292. Apparatus 100 further optionally includes a sound mode associated with menu 290, such that live sound is emitted from speakers 170 concurrent with live backup video 291. Thus for instance, if a child were to be behind the vehicle while the vehicle is in reverse gear 294, then sounds from the child, such as talking sounds or tricycle rolling sounds would be emitted from speaker 170. Additionally, the "Menu" virtual control button functions to return display screen 160 to the display of a higher level function control menu 190. It shall be noted that depicted virtual control button and displays of menu 290 shall be considered exemplary only and that it will be readily recognized that a person having ordinary skill in the art would readily appreciate a variety of different virtual control buttons and features.

Figure 15:
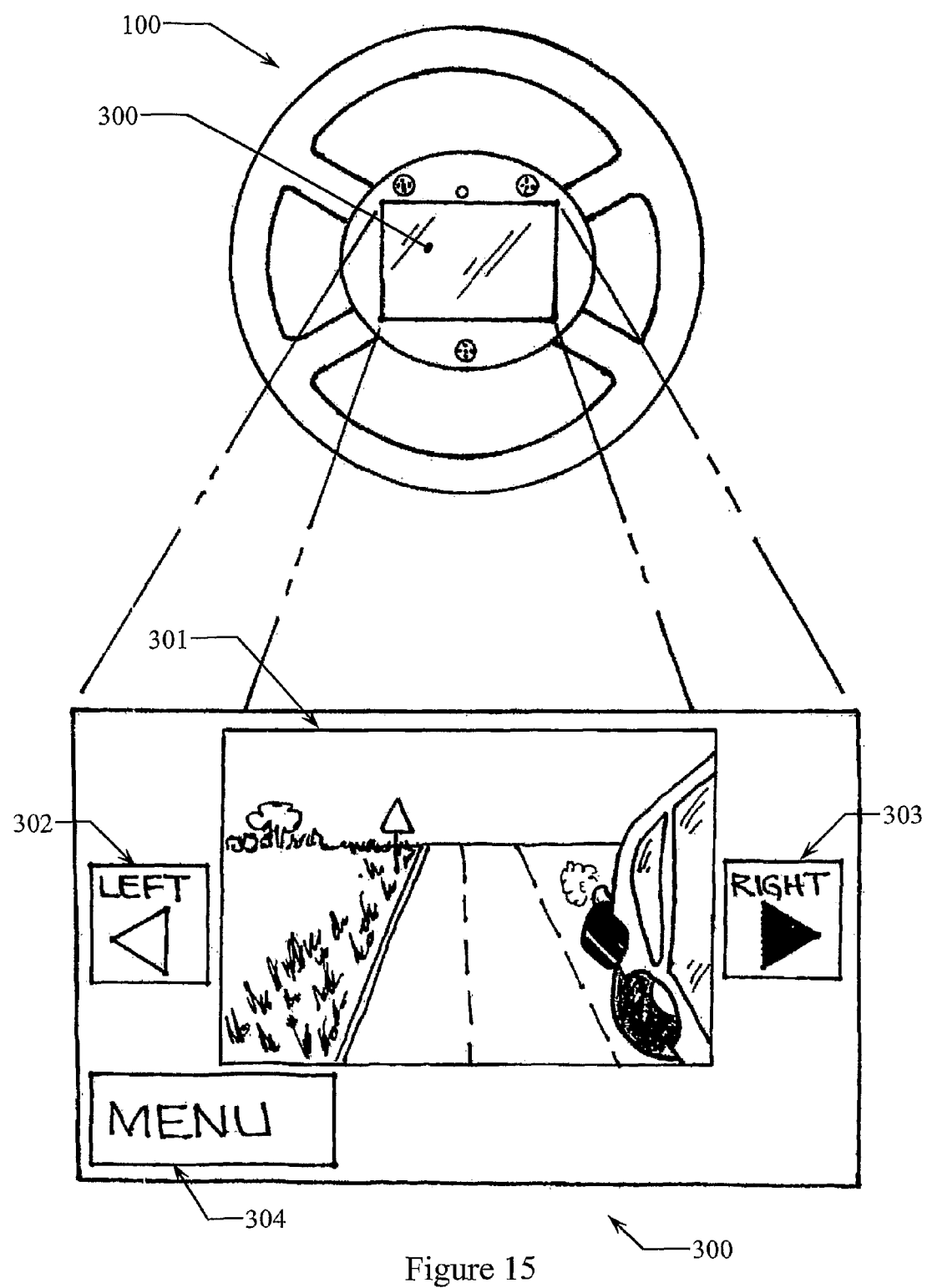
FIG. 15 illustrates a substantially front orthogonal view of the steering apparatus of the preferred embodiment and an enlarged view of the display of the apparatus shown displaying a live video feed of a vehicle blind spot field of view type menu display.

FIG. 15 shows a view of improved steering apparatus 100 with video display screen 160 of apparatus 100 showing blind spot field of view display menu 300 and a corresponding enlarged view of menu 300. Menu 300 is shown as having a blind spot field of view live video play area 301, vehicle left turn indication virtual control button 302, vehicle right turn indication virtual control button 303, and a "Menu" virtual control button 304. In practice, with steering apparatus 100 functionally installed in a vehicle, a user may effect the selection of turn indication by touching or speaking voice commands corresponding to the desired drive gear. Optionally, a manual turn indication lever is manipulated to select a turn indication, while the turn indication virtual control buttons 302 and 303 indicate the turn direction that is currently selected. Upon the selection of a turn indication, video display area 301 automatically initiates a display of live or real time video feed of the corresponding rearward blind spot field of view of said vehicle. Apparatus 100 also provides for a manual selection of the display of video area 301. In the sample blind spot video 301 of menu 300, roadway behind the vehicle and a portion of the vehicle in which apparatus 100 is installed is displayed. In this instance, a vehicle operator, upon seeing the blind spot area being free of other vehicles or obstructions, would be a better informed driver a thus vehicle operational safety would be increased. Apparatus 100 further optionally includes a sound mode associated with menu 300, such that live sound is emitted from speakers 170 concurrent with live blind spot video 301. Thus for instance, if a large truck were in the blind spot area of the vehicle, then sounds from the large truck, that might not otherwise be heard or appreciated by the vehicle operator due to vehicle cabin insulation from outside vehicle cabin noise, would be emitted from speaker 170. Additionally, the "Menu" virtual control button functions to return display screen 160 to the display of a higher level function control menu 190. It shall be noted that depicted virtual control button and displays of menu 300 shall be considered exemplary only and that it will be readily recognized that a person having ordinary skill in the art would readily appreciate a variety of different virtual control buttons and features.

Figure 16:
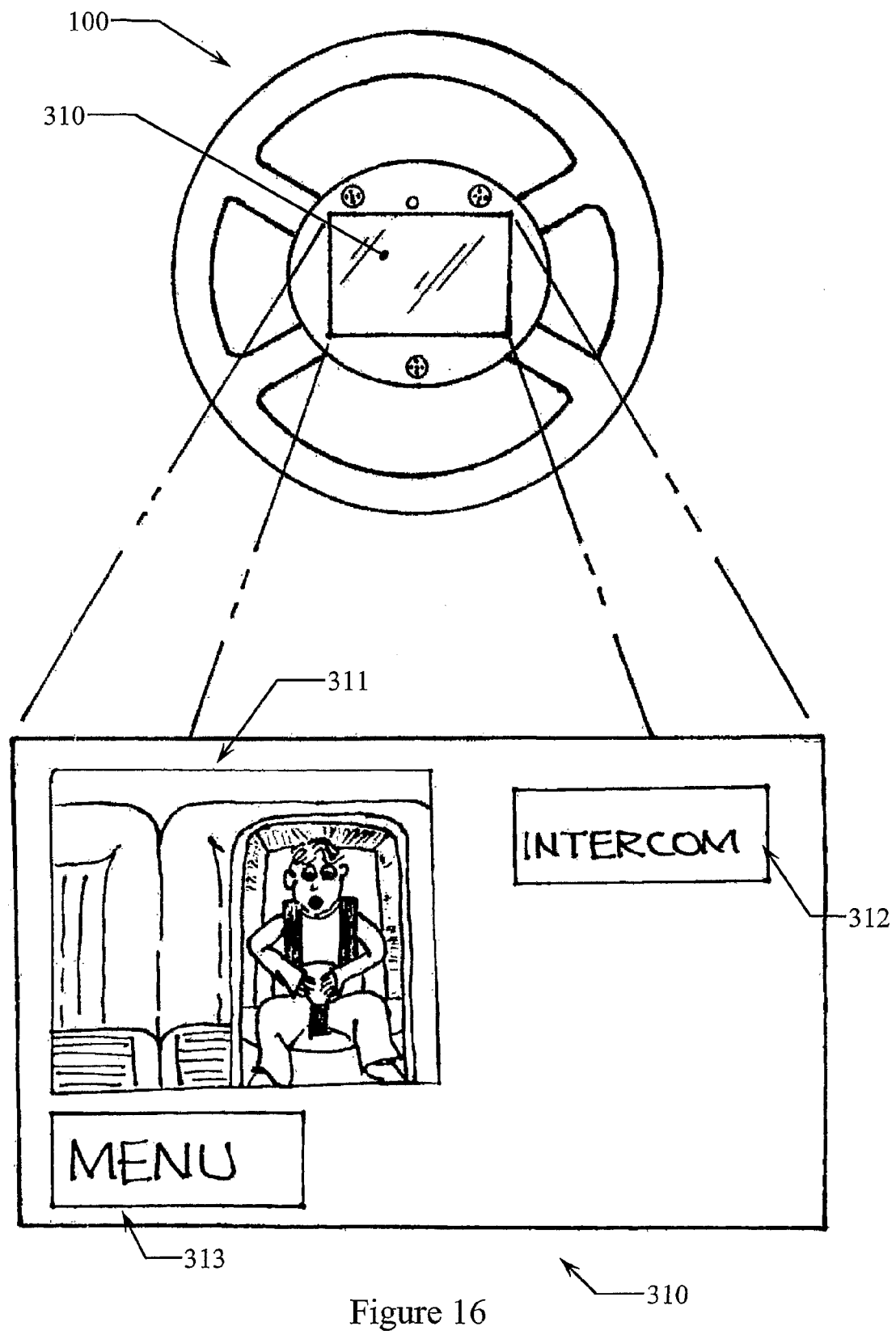
FIG. 16 illustrates a substantially front orthogonal view of the steering apparatus of an alternate embodiment and an enlarged view of the display of the apparatus shown displaying a live video feed of a vehicle rear cabin field of view and intercom or vehicle cabin public address type menu display, the display includes the view of a child in a child seat attempting to undue the child seat latch.

FIG. 16 shows a view of improved steering apparatus 100 with video display screen 160 of apparatus 100 showing rear cabin area field of view display menu 310 and a corresponding enlarged view of menu 310. Menu 310 is shown as having a rear cabin field of view live video play area 311, an "intercom" (public address) virtual control button 312, and a "Menu" virtual control button 313. In practice, with steering apparatus 100 functionally installed in a vehicle, a user may effect rear cabin area live viewing and intercom functions by touching or speaking voice commands corresponding to the desired option. Optionally, live video display 311 of menu 310, is automatically initiated upon microphone 176 detecting a predetermined sound pattern such as the sound pattern of a child crying. Apparatus 100 is preferably electrically connected to vehicle mounted speakers such that when apparatus 100 is in the intercom mode, a vehicle operator's voice is broadcast throughout the vehicle's cabin. Accordingly, a vehicle operator, may view rear seat passengers and talk to rear seat passengers, without having to turn the operators head. Additionally, the "Menu" virtual control button functions to return display screen 160 to the display of a higher level function control menu 190. It shall be noted that depicted vial control button and displays of menu 310 shall be considered exemplary only and that it will be readily recognized that a person having ordinary skill in the art would readily appreciate a variety of different virtual control buttons and features.

Figure 17:
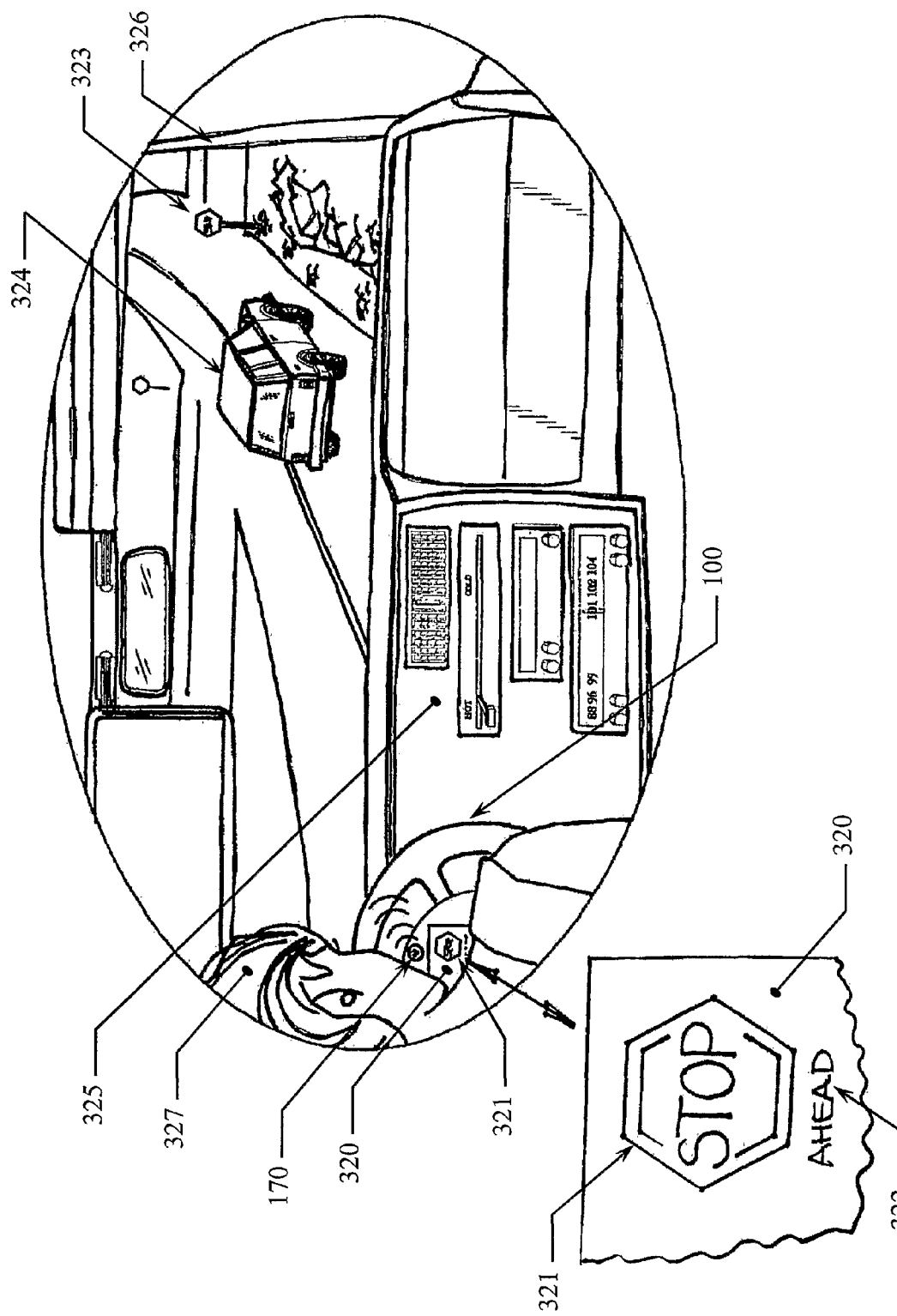
FIG. 17 illustrates a view from a vehicle cabin looking forward and approaching a road sign and a breakout enlargement view of a portion of the video display of the preferred embodiment displaying a live video feed of a vehicle forward traveling field of view with a superimposed image of a road sign corresponding to a road sign in the forward vehicle view.

FIG. 17 shows a view of improved steering apparatus 100 mounted in a vehicle, a portion of the vehicle interior including the vehicle dash board 325, the vehicle windshield 326, and a view of the roadway in front of the vehicle. The video display screen 160 of apparatus 100 is shown displaying a roadway sign display menu 320 and a corresponding enlarged view of a portion of menu 320. Menu 320 comprises the overlay display of a captured sign image or computer generated sign image 321, and corresponding text warning 322, over another display menu 190. In practice, with steering apparatus 100 functionally installed in a vehicle, and the vehicle having at least one camera mounted so as to observe a forward or vehicle path field of view and electrically connected to microprocessor 180, the vehicle's camera observes roadway signs and sends data corresponding to such signs to microprocessor 180. Microprocessor 180 analyzes observed road sign data, such as road sign 323, distinguishes relevant data from irrelevant data based predetermined optical character recognition and relevancy criteria, and transmits corresponding prioritized relevant data, in the form of an overlaid image such as image 321 and preferably associated text warning 322 which correspond to sign 323, for display in the form of menu 320. Display menu 320 is preferably augmented with an audible verbal warning from speaker 170 that corresponds to text warning 322. In determining the appropriate image to display, microprocessor 180 compares optically recognized images with a predetermined set of relevant images, and based on a predetermined degree of match and display priority, microprocessor 180 transmits the a select image and preferably select text, to display screen 160, to form menu 320. Exemplary priority levels for instance may comprise a first priority level being associated with critical driving requirements signs such as "stop", "yield", and "merging traffic" signs, a second priority level being associated with informational travel signs such as "distance to next service station", "high wind area", and "slippery when wet" signs, and a third priority level being associated with casual travel information signs such as "picnic area", "observation area" and "point of interest" signs. The displayed size of image 321 and text 322, and the volume of an associated audible warning, preferably correlate to the prior level of the associated observed sign 323. For instance, a larger image and text and a louder audible warning may be associated with a priority level one observation than what would be associated with a level two or a level three observation range. It is noted that in practice, it is not uncommon for the line of sight between an observer and a road sign to be partial or completely blocked or otherwise obscured. For instance, observation of sign 323 by vehicle driver 327 is partially blocked by vehicle 324. It is an advantage of apparatus 100 that apparatus 100 does not need to observe a road sign for as long of a duration as a human in order to recognize, prioritize, display, and warn of the sign. Further, even if a road sign is readily observable, apparatus 100 assists in alerting a driver to the sign when the driver is not as alert as the driver should otherwise be.

Figure 18:
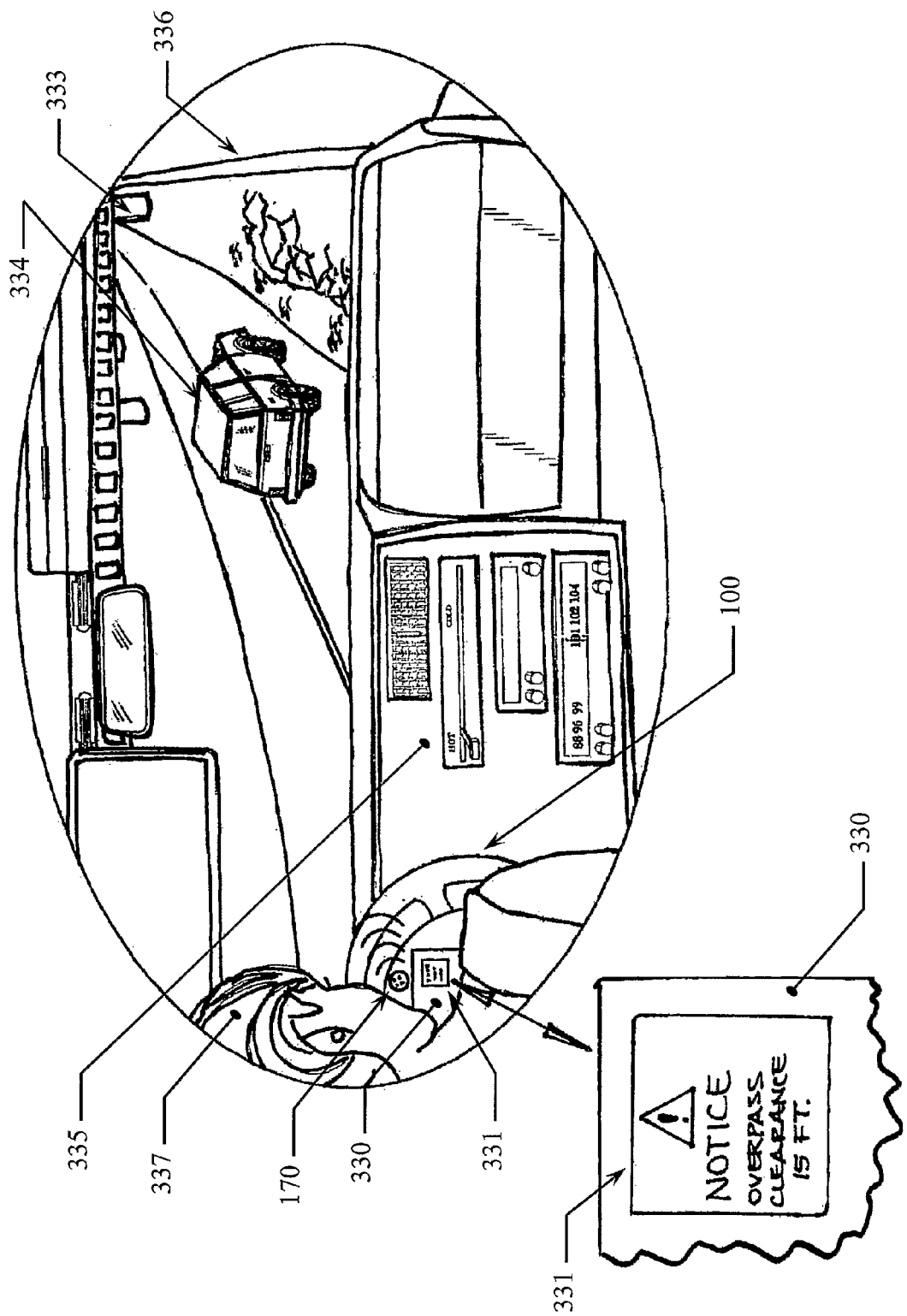
FIG. 18 illustrates a view from a vehicle cabin looking forward and approaching an underpass and a breakout enlargement view of the video display of the preferred embodiment automatically displaying a live video feed of a vehicle forward traveling and approaching an underpass field of view with a superimposed image of cautionary calculated underpass clearance warning.

FIG. 18 shows a view of improved steering apparatus 100 mounted in a vehicle, a portion of the vehicle interior including the vehicle dash board 335, the vehicle windshield 336, and a view of the roadway in front of the vehicle. The video display screen 160 of apparatus 100 is shown displaying an overpass clearance display menu 330 and a corresponding enlarged view of a portion of menu 330. Menu 330 comprises the overlay display of warning 331 over another display menu 190. Warning 331 comprises a warning image displaying the calculated clearance between the vehicle in which apparatus 100 is installed, and a structure under which the vehicle is to pass. In practice, with steering apparatus 100 functionally installed in a vehicle, and the vehicle having at least one radar type camera electrically connected to microprocessor 180, the vehicle's camera observes road way structures, such as overpass 333, signs, tunnels, and garages, under or through which the vehicle is anticipated pass, and sends data corresponding to such structures to microprocessor 180. The radar type camera also observes and transmits vehicle height data. Microprocessor 180 analyzes observed height data and calculates an anticipated clearance (or interference), and transmits corresponding data, in the form of an overlaid image such as image 331, for display in the form of menu 330. Display menu 330 is preferably augmented with an audible verbal warning from speaker 170 that corresponds to warning 331. It is noted that in practice, it is not uncommon for the line of sight between an observer and an overpass structure (or an overpass sign) to be partially or completely blocked or otherwise obscured. For instance, observation of overpass 333 by vehicle driver 337 may be temporarily partially blocked by vehicle 334. Furthermore, lighting conditions and driver alertness, and a driver's knowledge of the height of the driven vehicle including any vehicle top mounted cargo, are all factors that also affect the potential of a collision with an overpass type structure. It is an advantage of apparatus 100 that apparatus 100 does not need to observe roadway structures for as long of a duration as a human in order to recognize, calculate clearance, and display the appropriate warning. Further, apparatus 100 doesn't need good lighting conditions for menu 330 to function. Thus, overpass clearance display menu 330 increases the operational safety of a vehicle.

Figure 19:
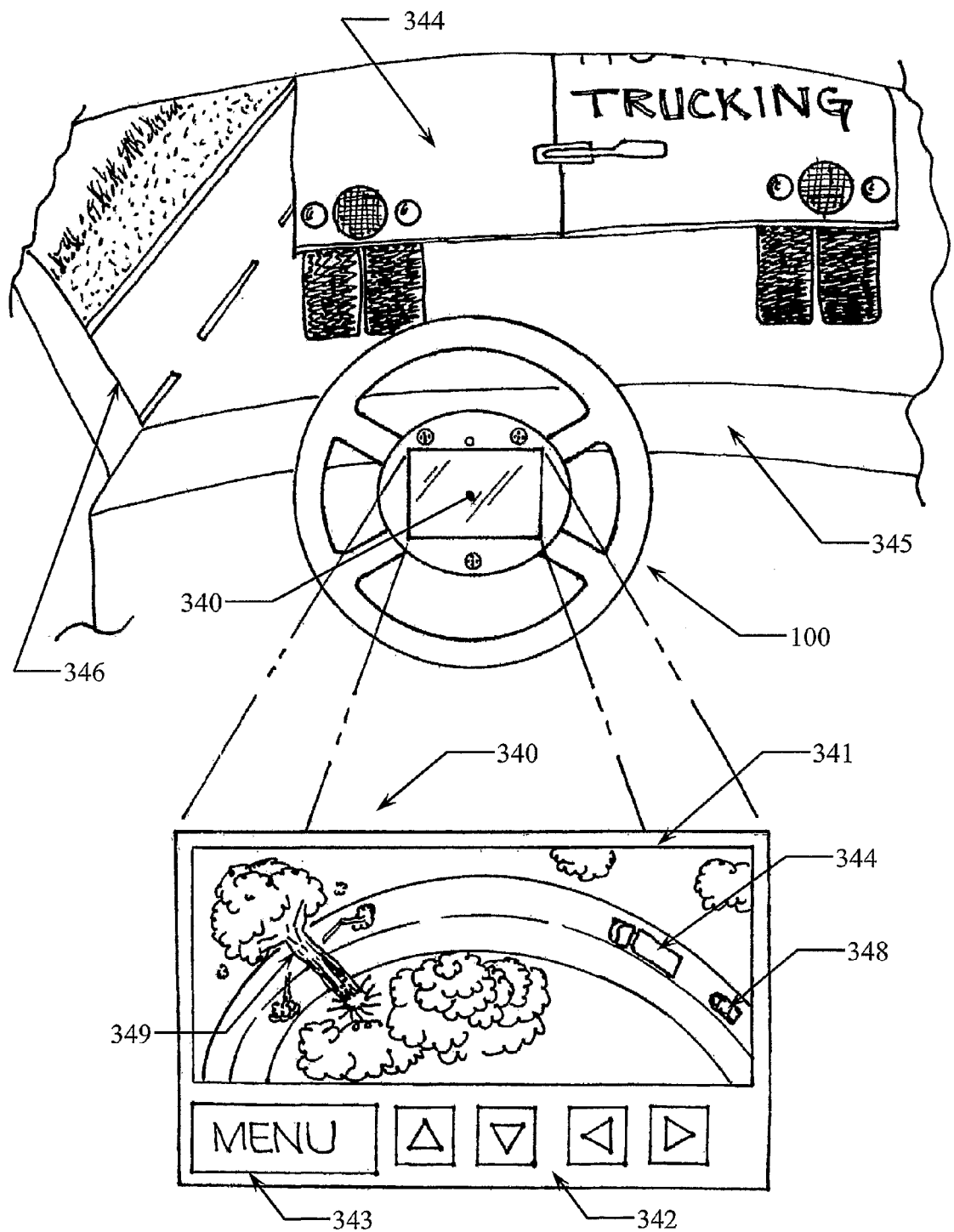
FIG. 19 illustrates a view from a vehicle cabin looking forward with a large truck immediately in front of the vehicle and a corresponding enlarged video display of the preferred embodiment displaying a simulated live video feed of a bird's eye view of the vehicle, the truck, and an obstruction in the roadway ahead of the vehicle.

FIG. 19 shows a view of improved steering apparatus 100 mounted in a vehicle 348, a portion of vehicle 348 interior including vehicle dash board 345, vehicle windshield 346, a view of the roadway in front of vehicle 348, and a large truck 344 immediately in front of vehicle 348. The video display screen 160 of apparatus 100 is shown displaying a bird's eye view display menu 340 and a corresponding enlarged view of menu 340. Menu 340 is shown as having a bird's eye view live or real time video play area 341, various view adjustment virtual control buttons 342, and a "Menu" virtual control button 343. Included display area 341 is a video display of vehicle 348, large truck 344, tree type obstruction 349, and the blind curve roadway ahead of vehicle 348. In practice, with steering apparatus 100 functionally installed in a vehicle such as vehicle 348, and apparatus 100 being wirelessly connected to a GPS type satellite information service, apparatus 348 wirelessly receives satellite data with respect to vehicle location and roadway hazards. At select times, an operator of vehicle 348 selects menu display 340. Such times may be for instance when vehicle 348 is behind an obstruction such as large truck 344 and more particularly, if operator of vehicle 348 is intending to pass large truck 344 while traveling on a road having a low visibility curve or pathway immediately in front of vehicle 348. Being provided with immanent roadway information, such as roadway information showing an obstruction such as fallen tree 349 or an oncoming vehicle, operator of vehicle 348 is much better prepared to make a passing decision. Display menu 340 is preferably augmented with an audible verbal warning from speaker 170 that corresponds to a situation depicted in display 341. For instance, when the situation displayed in display 341 is displayed, speakers 170 may emit a warning that suggests that passing is not advised and that the operator of vehicle 348 should slow down/stop due to obstruction 349. It is noted that the display of display 341 may be actual satellite fed live video, or the display of 349 may be a computer generated display based on satellite detected geometry. Thus, being forewarned, bird's eye view display menu 340 increases the operational safety of a vehicle.

Figure 20:
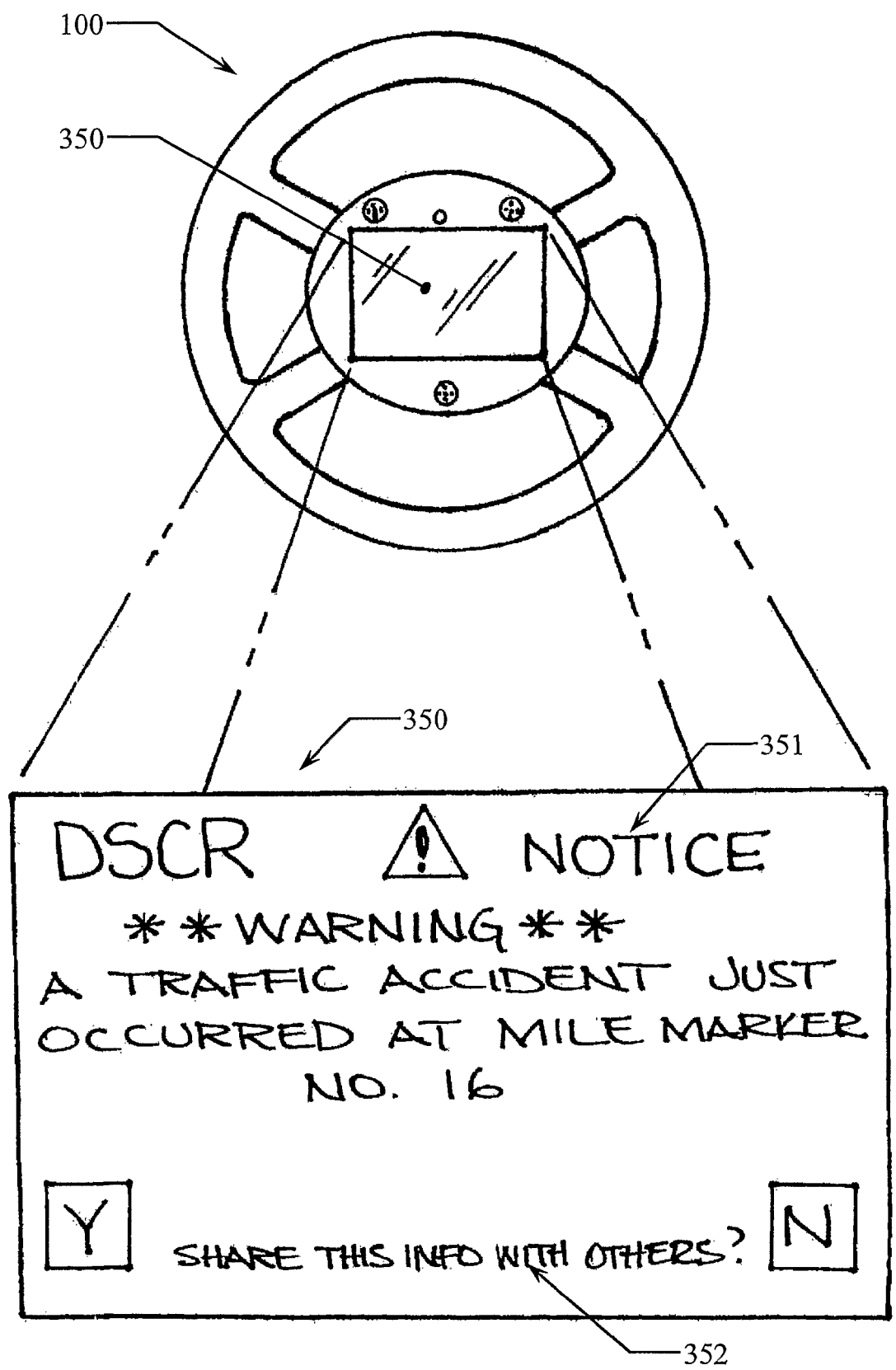
FIG. 20 illustrates a substantially front orthogonal view of the steering apparatus of the preferred embodiment and an enlarged view of the display of the apparatus shown displaying a DSCR transmitted warning and a prompting for a reply type menu display.

FIG. 20 shows a view of improved steering apparatus 100 with video display screen 160 of apparatus 100 showing DSRC data display menu 350 and a corresponding enlarged view of menu 350. Menu 350 is shown as having displaying a DSCR traffic accident warning 351, and an DSRC information sharing prompt 352 which includes "Y" (Yes) and "N" (No) virtual control buttons. In practice, with steering apparatus 100 functionally installed in a vehicle, a user may wirelessly receive, send, or "serve" DSRC data via apparatus 100 by using by touching or speaking voice commands corresponding to the desired option. When functioning in a server capacity, apparatus 100 relays DSRC data for a first DSRC data transceiving vehicle to a second DSRC data transceiving vehicle. The process of sending receiving, and serving such DSRC data from vehicle to vehicle is enabled by the ad-hoc creation of data networks among the vehicles. Such ad-hoc network creation has been termed "multi-hopping" by the industry. By means of sharing DSRC data, users are able to transmit vehicle traffic related information, such as traffic flow, traffic accidents, and weather data, as it relates immediately to their current road vicinity. Display menu 350 is preferably augmented with an audible verbal warning from speaker 170 that corresponds to text warning 351. A vehicle operator, having access to such DSRC data, is better able to timely respond to given road circumstances, thus increasing vehicle operational safety. It shall be noted that depicted virtual control button and displays of menu 350 shall be considered exemplary only and that it will be readily recognized that a person having ordinary skill in the art would readily appreciate a variety of different virtual control buttons and features.

Figure 21:
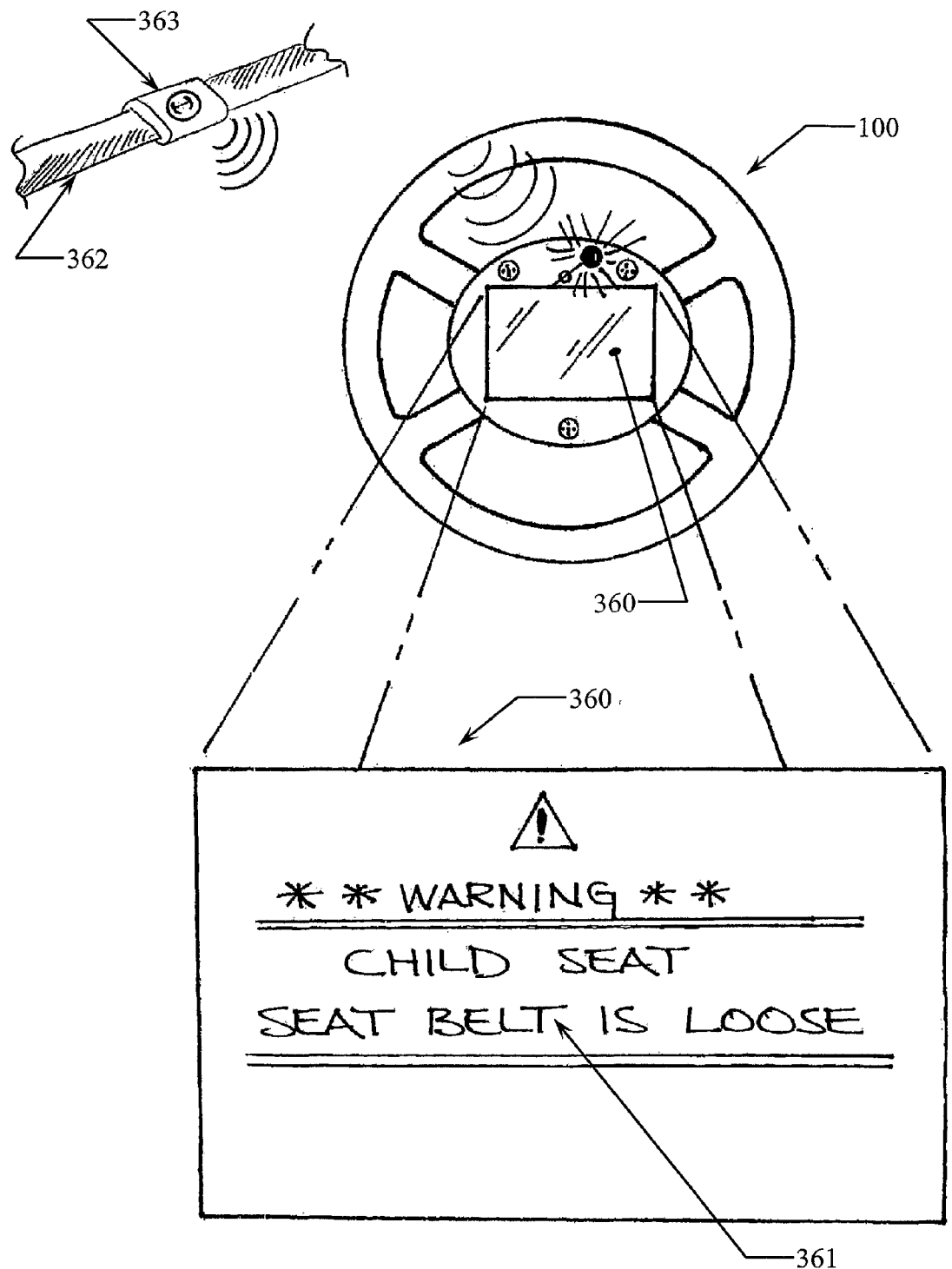
FIG. 21 illustrates an isometric view of a portion of a seatbelt having a seatbelt tension monitoring apparatus monitoring the tension in a seatbelt and sending a wireless signal that the seatbelt tension is outside of a predetermined acceptable seatbelt tension range and a substantially front orthogonal view of the steering apparatus of the preferred embodiment wirelessly receiving information from the tension monitoring apparatus and an enlarged view of the display of the steering apparatus shown displaying a corresponding child seat seatbelt warning type menu display.

FIG. 21 shows a view of improved steering apparatus 100 wirelessly receiving a signal and with video display screen 160 of apparatus 100 showing remote device monitoring and alert display menu 360, a corresponding enlarged view of menu 360, and a view of seatbelt 362 having seatbelt tension monitoring device 363 monitoring the tension of seatbelt 362 and transmitting a wireless signal Menu 360 is shown as "displaying a child seat seatbelt is loose" warning 361. Seatbelt tension monitoring device 363 is substantially identical to the device disclosed in US patent application 20050040960, except that seatbelt tension monitoring device 363 also includes the means to wirelessly transmit a warning signal when seatbelt tension monitoring device 363 detects that the tension load in seatbelt 362 is not within a predetermined acceptable tension range. In practice, with steering apparatus 100 functionally installed in a vehicle, device 363 tension monitoringly installed to seatbelt 362 in said vehicle, device 363 wirelessly transmits a warning signal apparatus 100, such as via a Bluetooth wireless transmission, upon the detection of tension load in seatbelt 362 as not being within a predetermined acceptable tension range. Apparatus 100 receives the wireless signal from device 363, and displays corresponding warning message 361 on menu 360 of display 160. Thus, a portable device such as device 363 is rendered readily operable when used in conjunction with a vehicle having apparatus 100 installed therein. It is noted that such warning being displayed in front of a vehicle operator, can be vitally important to a vehicle operator that may be deaf. Being so warned, a vehicle operator need not periodically turn the operators head and look behind the operator so as to assure that seatbelt 262 is out of tension. This elimination of the need to turn and monitor seatbelt device 363, substantially increases the operational safety of a vehicle.

Figure 25:
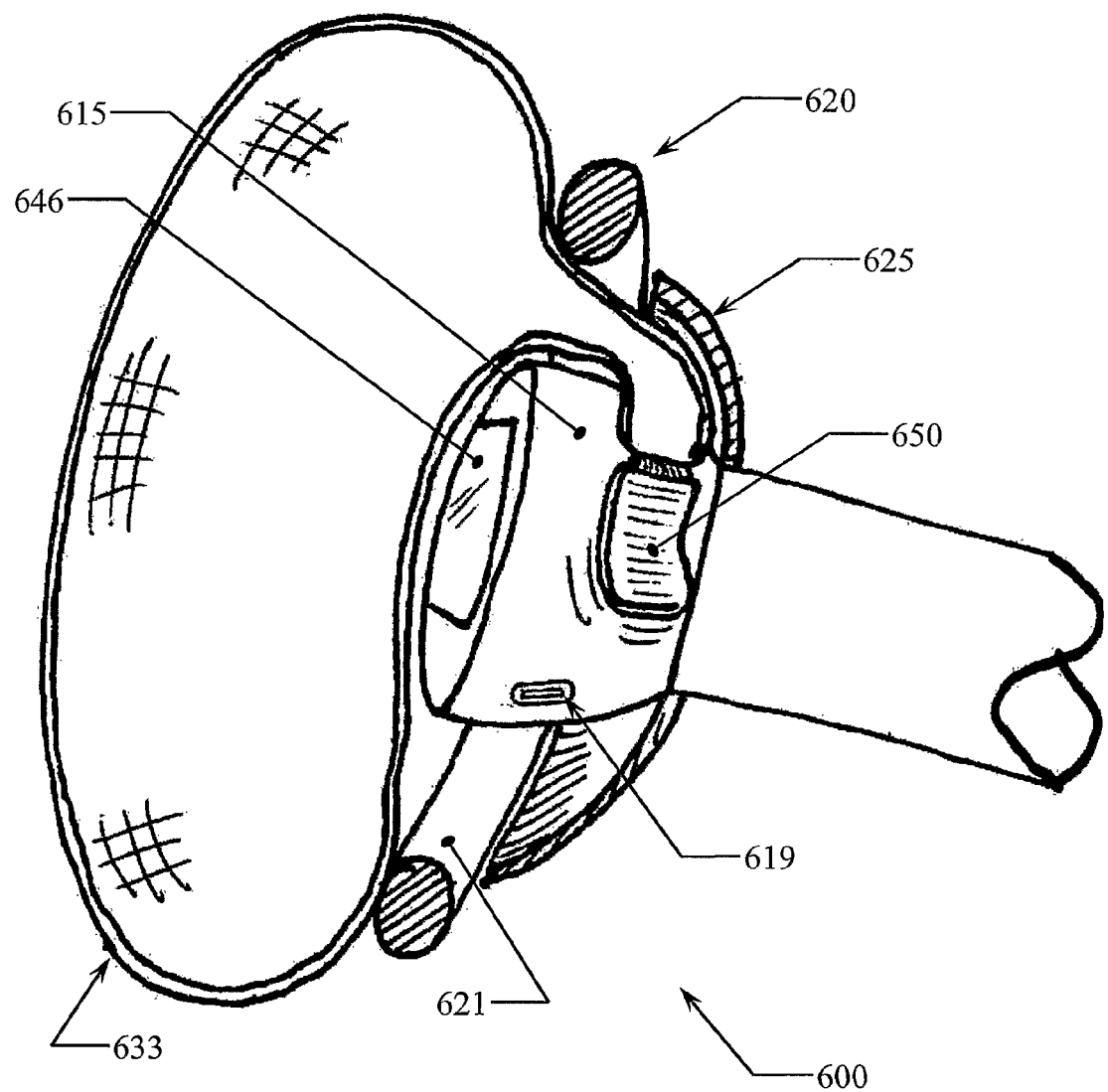
FIG. 25 illustrates a side isometric view of an alternate embodiment of the steering apparatus with the steering apparatus shown in the process of deployment, the airbag is shown as expanding out of a back side of the steering apparatus, expanding between the airbag module, a steering apparatus spoke, and the steering apparatus rim, and the module flap is shown opened with the display screen remaining unmoved by the airbag module deployment and a universal serial bus is shown on the side of the steering apparatus.

FIG. 25 shows improved steering apparatus alternate embodiment 600 in the process of deploying airbag 633 of apparatus 600. Apparatus 600 is substantially similar to apparatus 100 except that apparatus 600: has a display screen 660 (not shown) housed behind non deploying window 646, has a substantially non-rotating hub member 615 in which screen 660 is mounted, has USB port 619 mounted in a side of hub 615 position, and has an airbag 633 that deploys from behind deployable flap 650 on a non-front side of apparatus 600 and expands between non-rotating hub 615 and steering wheel rim 621 and expands immediately adjacent the front side of apparatus 600. Apparatus 600 includes the advantage of potentially not requiring a replacement of display screen 660 after deployment of apparatus 600 and the advantage of maintaining display screen 660 in a constant position regardless of the rotational orientation of steering wheel 621.

The present invention may be embodied in other specific forms without departing from its spirit or essential characteristics. The described embodiments are to be considered in all respects only as illustrative and not restrictive.

We claim:

1. A steering apparatus to effect the steering of an automotive vehicle, said apparatus comprising a steering device, an airbag module having an airbag, and at least one electronic display screen, wherein said airbag module is deployably mounted to said steering device to form a steering assembly, said steering assembly having a deployable flap with a window and a mounting pocket, and wherein said display screen is viewably disposed between the window and the mounting pocket of said deployable flap such that when said airbag module is deployed, said airbag opens said deployable flap and said airbag expands out of said steering assembly, and wherein said deployable flap and said display screen together are substantially rapidly moved relative to said steering device as said airbag expands.

2. The apparatus of claim 1, wherein said mounting pocket defines a retaining cavity and said display screen is viewably mounted within said retaining cavity, and wherein when said airbag module is deployed and opens said deployable flap, said display screen is retained within said retaining cavity of the mounting pocket as the deployable flap opens.

3. The apparatus of claim 1, wherein said mounting pocket and said window defines a retaining cavity between the window and the mounting pocket, and wherein said display screen has a substantially frangible display screen, and wherein said display screen is viewably mounted within said retaining cavity, and wherein when said airbag module is deployed and opens said deployable flap, if said display screen is fragmented into display screen fragments, said display screen fragments are substantially retained within said retaining cavity as said deployable flap opens.

4. The apparatus of claim 1, wherein said apparatus does not have a conventional mechanical control button.

5. The apparatus of claim 1, wherein said apparatus includes control means to control vehicle devices, and wherein said control means includes at least one control means of the following group of control means consisting of a touch activatable display screen control means and a voice activatable control means.

6. The apparatus of claim 5, wherein said control means provides the means to control at least one function of the following group of functions consisting of a phone call function, a vehicle climate change function, a vehicle speed change function, a vehicle entertainment activation function, a vehicle global positioning display activation function, a vehicle turn indication signal activation function, a vehicle windshield wiper activation function, a vehicle light activation function, a vehicle horn activation function, a vehicle performance indication display function, a vehicle real time blind spot observation function, a vehicle real time rear cabin area observation function, a vehicle rearward direction real time observation function, a public address function, a memo dictation and record function, an electronic data download function, an electronic data upload function, a displayed menu customization function, a real time bird's eye view of a vehicle function, a traffic sign display function, an automatic verbal warning emission in a user preferred language function, a voice modulation function, a dedicated short-range communications reception function, a dedicated short-range communications transmission function, and a dedicated short-range communications server function.

7. A steering apparatus for a vehicle having control means to control the performance of predetermined functions, said apparatus comprising a steering wheel, an airbag module having an airbag and an electronic display screen, wherein said airbag module is deployably mounted to said steering wheel, said airbag module having an external surface defining a deployable flap, and wherein said electronic display screen is mounted within said deployable flap between a mounting pocket in the deployable flap and the external surface such that said display screen is viewably accessible to a driver of the vehicle, and wherein when said airbag module is deployed, said airbag expands in a first direction and said display screen moves together with the deployable flap in a second direction.

8. The steering apparatus of claim 7 wherein when said airbag module is deployed, said deployable flap retains said display screen within said deployable flap.

9. The steering apparatus of claim 8 wherein the mounting pocket defines a retaining cavity and wherein said display screen is viewably contained within said retaining cavity and wherein when said airbag module is deployed, said display screen is substantially retained within said retaining cavity.

10. The steering apparatus of claim 9, wherein when said airbag module is deployed, said display screen is fragmented to form display screen fragments and wherein said display screen fragments are substantially retained within said retaining cavity.

11. The steering apparatus of claim 7, wherein said control means defines a touch activated display screen having at least one predetermined area of said display screen defining a virtual control button such that touching said virtual control button on said display screen controls the performance of a predetermined function.

12. The steering apparatus of claim 7, wherein said control means defines a voice actuation control means to control the performance of at least one of the predetermined functions.

13. The steering apparatus of claim 11, wherein said control means further defines a communication means for communication between said display screen and a function performing device.

14. The steering apparatus of claim 12, wherein said communication means defines at least one communication means of the following group of communication means, comprising: a wire, a wireless communication means, and a non-wireless communication means.

15. The steering apparatus of claim 7 wherein said predetermined functions define at least one function of the following group of functions comprising warning of a vehicle hazard function, warning of a traffic hazard function, activation of a vehicle real-time sight enhancement system function, activation of a vehicle comfort system function, activation of a vehicle global positioning system type navigation system function and activation of a vehicle post crash notification system function.

* * * * *